US007653309B2

(12) United States Patent
Bouda et al.

(10) Patent No.: US 7,653,309 B2
(45) Date of Patent: Jan. 26, 2010

(54) SYSTEM AND METHOD FOR DISTRIBUTING TRAFFIC IN AN OPTICAL NETWORK

(75) Inventors: Martin Bouda, Plano, TX (US); Stephen J. Brolin, Livingston, NJ (US)

(73) Assignee: Fujitsu Limited, Kawasaki (JP)

( * ) Notice: Subject to any disclaimer, the term of this patent is extended or adjusted under 35 U.S.C. 154(b) by 494 days.

(21) Appl. No.: 11/426,879

(22) Filed: Jun. 27, 2006

(65) Prior Publication Data
US 2007/0092255 A1    Apr. 26, 2007

Related U.S. Application Data

(63) Continuation-in-part of application No. 11/347,434, filed on Feb. 3, 2006, now Pat. No. 7,546,036.

(60) Provisional application No. 60/729,447, filed on Oct. 20, 2005, provisional application No. 60/756,925, filed on Jan. 6, 2006, provisional application No. 60/803,797, filed on Jun. 2, 2006.

(51) Int. Cl.
*H04J 14/00* (2006.01)
(52) U.S. Cl. .............................. 398/72; 398/63; 398/71
(58) Field of Classification Search .................. 398/66, 398/67, 70–74, 63
See application file for complete search history.

(56) References Cited
U.S. PATENT DOCUMENTS
4,555,810 A    11/1985  Khoe et al.
(Continued)

FOREIGN PATENT DOCUMENTS
EP    1 028 331 A2    8/2000
(Continued)

OTHER PUBLICATIONS

ITU-T Telecommunication Standardization Sector of ITU-T, G984.3, "Gigabit-Capable Passive Optical Network (G-PON): Transmission Convergence Layer Sepcification," Series G: Transmission Systems and Media, Digital Systems and Networks, Digital Sections and Digital Line System—Optical Line Systems for Local and Access Networks, Feb. 2004, 116 pages.

(Continued)

*Primary Examiner*—Dzung D Tran
(74) *Attorney, Agent, or Firm*—Baker Botts L.L.P.

(57) ABSTRACT

In accordance with the teachings of the present invention, a system and method for distributing traffic in an optical network is provided. In a particular embodiment, an optical network includes an upstream terminal, a distribution node, and a plurality of downstream terminals. The distribution node in the optical network includes a wavelength router configured to receive wavelength division multiplexed (WDM) traffic in a plurality of wavelengths from the upstream terminal, route the traffic in at least one wavelength to a primary power splitter, and route the traffic in a plurality of other wavelengths for distribution to particular downstream terminals. The distribution node also includes a primary power splitter configured to receive the traffic in the at least one wavelength from the wavelength router, split the received traffic in the at least one wavelength into a plurality of copies, and forward the copies for distribution to all of the downstream terminals.

10 Claims, 5 Drawing Sheets

U.S. PATENT DOCUMENTS

| | | | |
|---|---|---|---|
| 5,285,305 A | 2/1994 | Cohen et al. | |
| 5,321,541 A | 6/1994 | Cohen | 359/127 |
| 5,440,416 A | 8/1995 | Cohen et al. | 359/127 |
| 5,579,421 A | 11/1996 | Duvall et al. | |
| 5,694,234 A | 12/1997 | Darcie et al. | 359/125 |
| 5,926,298 A | 7/1999 | Li | 359/127 |
| 6,144,472 A | 11/2000 | Knox | 359/127 |
| 6,163,637 A | 12/2000 | Zirngibl | 385/37 |
| 6,411,410 B1 | 6/2002 | Wright et al. | |
| 6,498,876 B1 | 12/2002 | Liu et al. | 385/34 |
| 6,767,139 B2 | 7/2004 | Brun et al. | 385/84 |
| 7,245,829 B1 | 7/2007 | Sindile | |
| 7,389,048 B2 | 6/2008 | Kani et al. | |
| 2002/0061163 A1* | 5/2002 | Bartur et al. | 385/24 |
| 2002/0196491 A1 | 12/2002 | Deng et al. | |
| 2003/0002102 A1 | 1/2003 | Khalfallah et al. | |
| 2004/0001718 A1 | 1/2004 | Matthews et al. | |
| 2004/0131357 A1 | 7/2004 | Farmer et al. | |
| 2004/0175177 A1* | 9/2004 | Lee et al. | 398/72 |
| 2004/0184806 A1 | 9/2004 | Lee et al. | |
| 2005/0129404 A1 | 6/2005 | Kim et al. | 398/84 |
| 2005/0175343 A1* | 8/2005 | Huang et al. | 398/66 |
| 2005/0175344 A1 | 8/2005 | Huang et al. | |
| 2005/0180689 A1 | 8/2005 | Kozhevnikov et al. | |
| 2006/0056849 A1 | 3/2006 | Pamart et al. | |
| 2006/0120724 A1* | 6/2006 | Ishimura | 398/75 |
| 2006/0153567 A1 | 7/2006 | Kim et al. | |
| 2007/0092249 A1 | 4/2007 | Akasaka et al. | |
| 2007/0092250 A1 | 4/2007 | Bouda et al. | |
| 2007/0092251 A1 | 4/2007 | Bouda et al. | |
| 2007/0092252 A1 | 4/2007 | Bouda et al. | |
| 2007/0092253 A1 | 4/2007 | Bouda | |
| 2007/0092254 A1 | 4/2007 | Bouda | |
| 2007/0092255 A1 | 4/2007 | Bouda | |
| 2007/0166037 A1 | 7/2007 | Palacharla et al. | |
| 2007/0166043 A1 | 7/2007 | Bouda | |
| 2007/0183779 A1 | 8/2007 | Bouda | |
| 2007/0280690 A1 | 12/2007 | Bouda | |
| 2007/0280691 A1 | 12/2007 | Bouda | |

FOREIGN PATENT DOCUMENTS

| | | |
|---|---|---|
| EP | 1 130 806 A2 | 9/2001 |
| EP | 1 434 375 A2 | 6/2004 |
| WO | WO 2007/047559 | 4/2007 |
| WO | WO 2007/081748 | 7/2007 |

OTHER PUBLICATIONS

ITU-T Telecommunication Standardization Sector of ITU-T, G.984. 3, Series G: Study Period 2005-2008, "Updated Revised Amendment 1,: Amendment to Gigabit-Capable Passive Optical Network (G-PON): Transmission Convergence Layer Specification (2004)," pp. 1-39, May 16-27, 2005.

Park et al.; "Bidirectional Wavelength-Division-Multiplexing Self-Healing Passive Optical Network," Network Research Team, Telecommunications R&D Center, Samsung Electronics; 2005 Optical Society of America, 3 pages, Mar. 6, 2005.

Son et al.; "Survivable Network Architectures for WDM PON;" Korea Advanced Institute of Science and Technology; 2005 Optical Society of America, 3 Pages, Mar. 6, 2005.

Smith, Stephen, "Business Class Services Over a GPON Network," Fujitsu Network Communications; 10 pages, Mar. 5, 2006.

Wang et al.; "A Novel Centrally Controlled Protection Scheme for Traffic Restoration in WDM Passive Optical Networks;" IEEE Photonics Technology Letters, vol. 17, No. 3; Mar. 2005, pp. 717-719.

Suzuki et al.; "A Reliable Wide-Area WDM-PON Using Wavelength-Shifted Protection Scheme;" Access Network Service Systems Laboratories, NTT Corporation; 2 pages, Sep. 25, 2005.

ITU—Telecommunication Standardization Sector Study Group 15; "Recommendation G.983.5: A Broadband Optical Access System with Enhanced Survivability (for consent);" Editor, Recommendation G.983.5; 45 pages, Oct. 15-26, 2001.

Phillips et al.; "Redundancy Strategies for a High Splitting Optically Amplified Passive Optical Network," Journal of Lightwave Technology, vol. 19, No. 2; pp. 137-149, Feb. 2001.

Chan et al.; "A Novel Bidirectional Wavelength Division Multiplexed Passive Optical Network with 1:1 Protection;" Friday Morning, OFC, vol. 2; pp. 779-781, 2003.

Sun et al.; "A Novel Star-Ring Protection Architecture Scheme for WDM Passive Optical Access Networks;" Department of Information Engineering, The Chinese University of Hong Kong; 3 pages, Mar. 6, 2005.

Hirth, Ryan, "1 Gpbs to 10 Gbps Migration," Teknovus, Access the Future, IEEE Meeting, Jul. 2006, San Diego, CA, pp. 1-7.

Diouf, Leopold, "Next Generation Access (NGA)," An Alcatel-Lucent Contribution to NGA, FSAN Meeting, Munich, Germany, Feb. 7-9, 2007, pp. 1-30, published on FSAN website Jan. 31, 2007.

Handley et al., "A Comparison of WDM PON Architectures," Proceedings of the European Conference on Network and Optical Communications, Broadband Access and Technology. Amsterdam, IOS Press, NL, vol. part 1, pp. 141-147, Jan. 1, 1999.

International Searching Authority, "Notification of Transmittal of the International Search Report and the Written Opinion of the International Searching Authority, or the Declaration," (PCT Rule 44.1), International Application No. PCT/US2006/040318, mailed Feb. 14, 2007, 13 pages.

International Searching Authority, "Notification of Transmittal of the International Search Report and the Written Opinion of the International Searching Authority, or the Declaration," (PCT Rule 44.1), International Application No. PCT/US2006/040330, mailed Feb. 19, 2007, 13 pages.

International Searching Authority, "Notification of Transmittal of the International Search Report and the Written Opinion of the International Searching Authority, or the Declaration," (PCT Rule 44.1), International Application No. PCT/US2006/040605, 14 pages, mailed Feb. 14, 2007, 14 pages.

Bouda, "A Hybrid Passive Optical Network Using Shared Wavelengths," filed Feb. 3, 2006, 64 pps., 9 pps. drawings, U.S. Appl. No. 11/347,434.

Palacharla et al., "System and Method for Managing Network Components in a Hybrid Passive Optical Network," filed Oct. 25, 2006, 43 pps, 4 drawings U.S. Appl. No. 11/552,696.

Bouda, "System and Method for Transmitting Traffic in a Plurality of Passive Optical Networks," U.S. Appl. No. 11/627,809, filed Jan. 26, 2007, 35 pps., 5 pps. drawings.

Bouda, "System and Method for Managing Different Transmission Architectures in a Passive Optical Network," U.S. Appl. No. 11/627,793, 42 pps., 4 pps. drawings, Jan. 26, 2007.

Bouda, "System and Method for Distributing Traffic in an Optical Network," U.S. Appl. No. 11/426,879, filed Jun. 27, 2006, 43 pps., 5 pps. drawings.

Akasaka et al., "System and Method for Traffic Distribution in an Optical Network," U.S. Appl. No. 11/426,884, filed Jun. 27, 2006, 71 pps., 12 pps. drawings.

Bouda et al., "Method and System for Increasing Downstream Bandwidth in an Optical Network," filed Jan. 5, 2007, 42 pps., 10 pps. drawings, U.S. Appl. No. 11/620,144.

Bouda, "Distribution Node for an Optical Network," filed Jan. 4, 2007, 38 pps., 6 pps. drawings, U.S. Appl. No. 11/619,945.

Akasaka et al., "System and Method for Protecting an Optical Network," filed Dec. 11, 2006, 42 pps., 4 pps. drawings, U.S. Appl. No. 11/609,120.

Bouda et al., "System and Method for Extending Reach in a Passive Optical Network," filed Jan. 31, 2007, 51 pps, 5 pps. drawings, U.S. Appl. No. 11/669,657.

Bouda, "System and Method for Transmitting Optical Markers in a Passive Optical Network System," 52 pps., 5 pps. drawings, filed Jan. 31, 2007, U.S. Appl. No. 11/669,667.

International Searching Authority, "Notification of Transmittal of the International Search Report and the Written Opinion of the International Searching Authority, or the Declaration," (PCT Rule 44.1), International Application No. PCT/US2006/042224, mailed Mar. 5, 2007, 13 pages.

International Searching Authority, "Notification of Transmittal of the International Search Report and the Written Opinion of the International Searching Authority, or the Declaration," (PCT Rule 44.1), International Application No. PCT/US2006/040597, mailed Mar. 5, 2007, 15 pages, Mar. 5, 2004.

International Searching Authority, "Notification of Transmittal of the International Search Report and the Written Opinion of the International Searching Authority, or the Declaration," (PCT Rule 44.1), International Application No. PCT/US2006/042220, mailed Mar. 12, 2007, 12 pages.

Zang et al., "A Review of Routing and Wavelength Assignment Approaches for Wavelength-Routed Optical WDM Networks," Optical Networks Magazine, SPIE, Bellingham, WA, US, vol. 1, No. 1, Jan. 2000, pp. 47-60.

Bouda, "System and Method for Protecting an Optical Network," U.S. Appl. No. 11/680,186, filed Feb. 28, 2007, 35 pps., 6 pps. drawings.

International Searching Authority, "Notification of Transmittal of the International Search Report and the Written Opinion of the International Searching Authority, or the Declaration," (PCT Rule 44.1), International Application No. PCT/US2006/043188, mailed Mar. 14, 2007, 12 pages.

Langer et al, "Promising Evolution Paths for Passive Optical Access Networks," Proceedings of 2004 6th International Conference on Warsaw, Poland, Jul. 4, 2004 through Jul. 7, 2004, IEEE vol. 1, pp. 202-207.

International Searching Authority, "Notification of Transmittal of the International Search Report and the Written Opinion of the International Searching Authority, or the Declaration," (PCT Rule 44.1), International Application No. PCT/US2007/002955, mailed Jun. 28, 2007, 11 pages.

Wagner et al., "Technology and System Issues for a WDM-Based Fiber Loop Architecture," Journal of Lightwave Technology, IEEE Service Center, New York, NY, vol. 7, No. 11, Nov. 1, 1989, pp. 1759-1768.

Frigo et al., "A Wavelength-Division Multiplexed Passive Optical Network with Cost-Shared Components," IEEE Photonics Technology Letters, IEEE Service Center, Piscataway, NJ, vol. 4, No. 11, Nov. 1, 1994, pp. 1365-1367.

Oakley, "An Economic Way to See in the Broadband Dawn," Institute of Electrical and Electronics Engineers, Communications for the Information Age, Proceedings of the Global Telecommunications Conference and Exhibition (Globecom), New York, IEEE, vol. 3, Nov. 28, 1988, pp. 1574-1578.

International Searching Authority, "Notification of Transmittal of the International Search Report and the Written Opinion of the International Searching Authority, or the Declaration," (PCT Rule 44.1), International Application No. PCT/US2007/000184, mailed Jul. 27, 2007, 13 pages.

Asatani et al., "A Field Trial of Fiber Optic Subscriber Loop Systems Utilizing Wavelength-Division Multiplexers," IEEE Transactions on Communications, IEEE Service Center, Piscataway, NJ, vol. COM-30, No. 9, Sep. 1982, pp. 2172-2184.

Cheng et al., "Integrated a Hybrid CATV/GPON Transport System Based on 1.31/1.49/1.55um WDM Transceiver Module," 2005 Quantum Electronics and Laser Science Conference, pp. 1678-1680, 2005.

Palacharla et al.., System and Method for Managing Communication in a Hybrid Passive Optical Network, filed May 2, 2007, U.S. Appl. No. 11/743,311, 50 pages, 6 pages of drawings.

International Searching Authority, "Notification of Transmittal of the International Search Report and the Written Opinion of the International Searching Authority, or the Declaration," (PCT Rule 44.1), International Application No. PCT/US2007/000189, mailed Jul. 18, 2007, 12 pages.

Son, et al., Bidirectional WDM Passive Optical Network for Simultaneous Transmission of Data and Digital Broadcast Video Service, Journal of Lightwave Technology, vol. 21, No. 8, © 2003 IEEE, pp. 1723-1727, Aug. 2003.

Ching, et al., Passive Optical Networks, Sharing the Fiber, Merrill Lynch & Co. (27 pages), May 15, 2001.

Kuhlow, et al., AGW-Based Device for a WDM Overlay PON in the 1.5-μm Bank, IEEE Photonics Technology Letters, vol. 11, No. 2, © 1999 IEEE, pp. 218-220, Feb. 1999.

Feldman, et al., An Evaluation of Architectures Incorporating Wavelength Division Multiplexing for Broad-Bank Fiber Access, Journal of Lightwave Technology, vol. 16, No. 9, © 1998 IEEE, pp. 1546-1559, Sep. 1998.

Giles, et al., Access PON Using Downstream 1550-nm WDM Routing and Upstream 1300-nm SCMA Combining Through a Fiber-Grating Router, IEEE Photonics Technology Letters, vol. 8, No. 11, © 1996 IEEE, pp. 1549-1551, Nov. 1996.

Hilbk, et al., High Capacity WDM Overlay on a Passive Optical Network, Electronics Letters, vol. 32, No. 23, pp. 2162-2163, Nov. 7, 1996.

Inoue, et al., Silica-based Arrayed-Waveguide Grating Circuit as Optical Splitter/Router, Electronics Letters, vol. 31, No. 9, pp. 726-727, Apr. 27, 1995.

Kashima, Upgrade of Passive Optical Subscriber Network, Journal of Lightwave Technology, vol. 9, No. 1, © 1991 IEEE, pp. 113-120, Jan. 1991.

Lin, Passive Optical Subscriber Loops with Multiaccess, Journal of Lightwave Technology, vol. 7, No. 11, © 1989 IEEE, pp. 1769-1777, Nov. 1989.

(Mems)* Singlemode Fiber Optic Switch, FO5935, MOOG Components Group (2 pages), © 2005.

PON & FTTx Update, Light Reading, (11 pages), Aug. 8, 2005.

ITU-T Telecommunication Standardization Sector of ITU, G.984.1, Series G: Transmission Systems and Media, Digital Systems and Networks Digital sections and digital line system—Optical Line systems for local and access networks, Gigabit-capable Passive Optical Networks (GPON): General Characteristics. (20 pages), Mar. 2003.

ITU-T Telecommunication Standardization Sector of ITU, G.983.1, Series G: Transmission Systems and Media, Digital Systems and Networks Digital sections and digital line system—Optical Line systems for local and access networks, Broadband Optical Access Systems Based on Passive Optical Networks (117 pages), Jan. 2005.

ITU-T Telecommunication Standardization Sector of ITU, G.983.3, Series G: Transmission Systems and Media, Digital Systems and Networks Digital sections and digital line system—Optical Line systems for local and access networks, A Broadband Optical Access Systems with Increased Service Capability by Wavelength Allocation (52 pages), Mar. 2001.

Green, Paul E., Jr., Fiber-to-the-Home White Paper, 21 pgs., Feb. 21, 2003.

Bouda, A Distribution Node for a Wavelength-Sharing Network, U.S. Appl. No. 11/347,612, filed Feb. 3, 2006.

Bouda, et al., Distribution Components for a Wavelength-Sharing Network, U.S. Appl. No. 11/347,585, filed Feb. 3, 2006.

Bouda, et al., Upgradeable Passive Optical Network, U.S. Appl. No. 11/347,446, filed Feb. 3, 2006.

Bouda, System and Method for Transmitting Upstream Traffic in an Optical Network, U.S. Appl. No. 11/426,875, filed Jun. 27, 2006.

Akasaka, et al., System and Method for Traffic Distribution in an Optical Network, U.S. Appl. No. 11/426,884, filed Jun. 27, 2006.

International Searching Authority, "Notification of Transmittal of the International Search Report and the Written Opinion of the International Searching Authority, or the Declaration," (PCT Rule 44.1), International Application No. PCT/US2007/002851, mailed Aug. 21, 2007, 11 pages.

European Patent Office, European Search Report and Office Action, Application No. 07010686-9-2415, mailed Aug. 21, 2007, 14 pages.

Son et al., "Bidirectional Passive Optical Network for the Transmission of WDM Channels with Digital Broadcast Video Signals," Optical Society of America/Institute of Electrical and Electronics Engineers, Optical Fiber Communication Conference and Exhibit (OFC). Technical Digest, Post Conference Digest, Mar. 17-22, 2002, Trends in Optical and Photonic Series, pp. 767-768.

* cited by examiner

SYSTEM AND METHOD FOR DISTRIBUTING TRAFFIC IN AN OPTICAL NETWORK

CROSS-REFERENCE TO RELATED APPLICATIONS

This application is a Continuation-in-Part of application Ser. No. 11/347,434 filed Feb. 3, 2006 now U.S. Pat. No. 7,546,036 by Bouda, et al., and entitled Hybrid Passive Optical Network Using Shared Wavelengths, which claims benefit under 35 U.S.C. § 119(e) of U.S. Provisional Application Ser. No. 60/729,447 filed Oct. 20, 2005 by Bouda et al., and entitled Passive Optical Network Using Shared Wavelengths; and U.S. Provisional Application Ser. No. 60/756,925 filed Jan. 6, 2006 by Bouda, et al. and entitled Hybrid Passive Optical Network Components. This application also claims benefit under 35 U.S.C. § 119(e) of U.S. Provisional Application Ser. No. 60/803,797 filed Jun. 2, 2006 by Bouda and entitled System and Method for Distributing Traffic in an Optical Network; U.S. Provisional Application Ser. No. 60/756,925 filed Jan. 6, 2006 by Bouda, et al. and entitled Hybrid Passive Optical Network Components; and U.S. Provisional Application Ser. No. 60/729,447 filed Oct. 20, 2005 by Bouda et al., and entitled Passive Optical Network Using Shared Wavelengths.

TECHNICAL FIELD

The present invention relates generally to communication systems and, more particularly, to a system and method for distributing traffic in an optical network.

BACKGROUND

In recent years, a bottlenecking of communication networks has occurred in the portion of the network known as the access network. Bandwidth on longhaul optical networks has increased sharply through new technologies such as WDM and transmission of traffic at greater bit rates. Metropolitan-area networks have also seen a dramatic increase in bandwidth. However, the access network, also known as the last mile of the communications infrastructure connecting a carrier's central office to a residential or commercial customer site, has not seen as great of an increase in affordable bandwidth. The access network thus presently acts as the bottleneck of communication networks, such as the internet.

Power-splitting passive optical networks (PSPONs) offer one solution to the bottleneck issue. PSPONs refer to typical access networks in which an optical line terminal (OLT) at the carrier's central office transmits traffic over one or two downstream wavelengths for broadcast to optical network units (ONUs). An ONU refers to a form of access node that converts optical signals transmitted via fiber to electrical signals that can be transmitted to individual subscribers and vice versa. In the upstream direction, ONUs typically time-share transmission of traffic in one wavelength.

PSPONs address the bottleneck issue by providing greater bandwidth at the access network than typical access networks. For example, networks such as digital subscriber line (DSL) networks that transmit traffic over copper telephone wires typically transmit at a rate between approximately 144 kilobits per second (KB/s) and 1.5 megabits per second (MB/s). Conversely, Broadband PONs (BPONs), which are example PSPONs, are currently being deployed to provide hundreds of megabits per second capacity shared by thirty-two users. Gigabit PONs (GPONs), another example of a PSPON, typically operate at speeds of up to 2.5 gigabits per second (GB/s) by using more powerful transmitters, providing even greater bandwidth. Other PSPONs include, for example, asynchronous transfer mode PONs (APONs) and gigabit Ethernet PONs (GEPONs).

Although PSPONs may offer much greater bandwidth than typical access networks such as DSL networks, bandwidth requirements are projected to exceed even the increased capacity offered by typical PSPONs. For example, some streaming video and online gaming applications presently require bit rates of approximately one to ten MB/s, and some IP high definition television and video-on-demand systems presently require bit rates of approximately twenty MB/s. Future demands for bandwidth are projected to be even greater. Thus, a need exists for an access network that provides even greater bandwidth.

Another solution to the present bottlenecking issue that would also satisfy demand for bandwidth for many years to come is using wavelength division multiplexing passive optical networks (WDMPONs). These networks comprise access networks in which each ONU receives and transmits traffic over a dedicated downstream and upstream wavelength, respectively. By transmitting traffic over dedicated wavelengths, WDMPONs dramatically increase network capacity over existing networks (including typical PSPONs). However, WDMPONs tend to be very expensive compared to PSPONs, the technological risks of deployment of WDMPONs are very high, and WDMPONs provide much more bandwidth than is presently demanded. Thus, a need exists for a seamless upgrade solution from PSPON that is more cost-effective than WDMPON.

SUMMARY

In accordance with the teachings of the present invention, a system and method for distributing traffic in an optical network is provided. In a particular embodiment, an optical network includes an upstream terminal, a distribution node, and a plurality of downstream terminals. The distribution node in the optical network includes a wavelength router configured to receive wavelength division multiplexed (WDM) traffic in a plurality of wavelengths from the upstream terminal, route the traffic in at least one wavelength to a primary power splitter, and route the traffic in a plurality of other wavelengths for distribution to particular downstream terminals. The distribution node also includes a primary power splitter configured to receive the traffic in the at least one wavelength from the wavelength router, split the received traffic in the at least one wavelength into a plurality of copies, and forward the copies for distribution to all of the downstream terminals.

Technical advantages of one or more embodiments of the present invention may include managing power loss more efficiently in the distribution node of upgradeable power splitting passive optical networks (PSPONs) and hybrid PONs (HPONs). In particular embodiments, the distribution node in one of these networks may also have a more cost-efficient design. In particular embodiments, in-service upgrades from a PSPON to an HPON may also be achieved.

It will be understood that the various embodiments of the present invention may include some, all, or none of the enumerated technical advantages. In addition other technical advantages of the present invention may be readily apparent to one skilled in the art from the figures, description, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
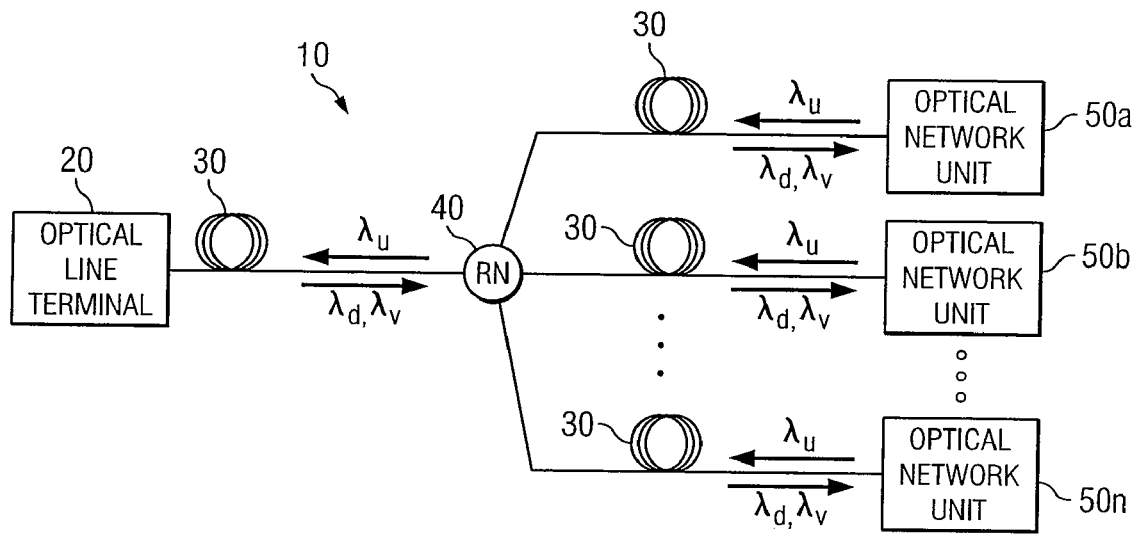
FIG. 1 is a diagram illustrating an example power splitting PON (PSPON)

FIG. 1 is a diagram illustrating an example Power Splitting Passive Optical Network (PSPON) 10. Typically, PSPONs have been employed to address the bottlenecking of communications networks in the portion of the network known as the access network. In recent years, bandwidth on longhaul optical networks has increased sharply through new technologies such as wavelength division multiplexing (WDM) and transmission of traffic at greater bit rates. In addition, metropolitan-area networks have also seen a dramatic increase in bandwidth. However, the access network, also known as the last mile of the communications infrastructure connecting a carrier's central office to a residential or commercial customer site, has not seen as great of an increase in affordable bandwidth. The access network thus presently acts as the bottleneck of communication networks, such as the internet.

PSPONs address the bottleneck issue by providing greater bandwidth at the access network than typical access networks. For example, networks such as digital subscriber line (DSL) networks that transmit traffic over copper telephone wires typically transmit at a rate between approximately 144 kilobits per second (KB/s) and 1.5 megabits per second (MB/s). Conversely, broadband PONs (BPONs) are currently being deployed to provide hundreds of megabits per second capacity shared by thirty-two users. Gigabit PONs (GPONs), which typically operate at speeds of up to 2.5 gigabits per second (GB/s) by using more powerful transmitters, provide even greater bandwidth.

Referring back to PSPON 10 of FIG. 1, PSPON 10 includes an Optical Line Terminal (OLT) 20, optical fiber 30, a Remote Node (RN) 40, and Optical Network Units (ONUs) 50. PSPON 10 refers to typical access networks in which an optical line terminal (OLT) at the carrier's central office transmits traffic over one or two downstream wavelengths for broadcast to optical network units (ONUs). PSPON 10 may be an asynchronous transfer mode PON (APON), a BPON, a GPON, a gigabit Ethernet PON (GEPON), or any other suitable PSPON. A feature common to all PSPONs 10 is that the outside fiber plant is completely passive. Downstream signals transmitted by the OLT are passively distributed by the RN to downstream ONUs coupled to the RN through branches of fiber, where each ONU is coupled to the end of a particular branch. Upstream signals transmitted by the ONUs are also passively forwarded to the OLT by the RN.

OLT 20 (which may be an example of an upstream terminal) may reside at the carrier's central office (where it may be coupled to a larger communication network) and includes a transmitter operable to transmit traffic in a downstream wavelength, such as $\lambda_d$, for broadcast to all ONUs 50, which may reside at or near customer sites. OLT 20 may also include a transmitter operable to transmit traffic in a second downstream wavelength $\lambda_v$ (which may be added to $\lambda_d$) for broadcast to all ONUs 50. As an example, in typical GPONs, $\lambda_v$ may carry analog video traffic. Alternatively, $\lambda_v$ may carry digital data traffic. OLT 20 also includes a receiver operable to receive traffic from all ONUs 50 in a time-shared upstream wavelength, $\lambda_u$. In typical PSPONs, downstream traffic in $\lambda_d$ and $\lambda_v$ is transmitted at a greater bit rate than is traffic in $\lambda_u$, as PSPONs typically provide lower upstream bandwidth than downstream bandwidth. It should be noted that "downstream" traffic refers to traffic traveling in the direction from the OLT (or upstream terminal) to the ONUs (or downstream terminals), and "upstream" traffic refers to traffic traveling in the direction from the ONUs (or downstream terminals) to the OLT (or upstream terminal). It should further be noted that $\lambda_d$ may include the band centered around 1490 nm, $\lambda_v$ may include the band centered around 1550 nm, and $\lambda_u$ may include the band centered around 1311 nm in particular PSPONs.

Optical fiber 30 may include any suitable fiber to carry upstream and downstream traffic. In certain PSPONs 10, optical fiber 30 may comprise, for example, bidirectional optical fiber. In other PSPONs 10, optical fiber 30 may comprise two distinct fibers. RN 40 of PSPON 10 (which may also generally be referred to as a distribution node) comprises any suitable power splitter, such as an optical coupler, and connects OLT 20 to ONUs 50. RN 40 is located in any suitable location and is operable to split a downstream signal such that each ONU 50 receives a copy of the downstream signal. Due to the split and other possible power losses, each copy forwarded to an ONU has less than 1/N of the power of the downstream signal received by RN 40, where N refers to the number of ONUs 50. In addition to splitting downstream signals, RN 40 is also operable to combine into one signal upstream, time-shared signals transmitted by ONUs 50. RN 40 is operable to forward the upstream signal to OLT 20.

ONUs 50 (which may be examples of downstream terminals) may include any suitable optical network unit or optical network terminal (ONT) and generally refer to a form of access node that converts optical signals transmitted via fiber to electrical signals that can be transmitted to individual subscribers. Subscribers may include residential and/or commercial customers. Typically, PONs 10 have thirty-two ONUs 50 per OLT 20, and thus, many example PONs may be described as including this number of ONUs. However, any suitable number of ONUs per OLT may be provided. ONUs 50 may include triplexers that comprise two receivers to receive downstream traffic (one for traffic in $\lambda_d$ and the other for traffic in $\lambda_v$) and one transmitter to transmit upstream traffic in $\lambda_u$. The transmission rate of the ONU transmitter is typically less than the transmission rate of the OLT transmitter (due to less demand for upstream capacity than for downstream capacity). Each ONU 50 is operable to process its designated downstream traffic and to transmit upstream traffic according to an appropriate time-sharing protocol (such that the traffic transmitted by one ONU in $\lambda_u$ does not collide with the traffic of other ONUs in $\lambda_u$).

In operation, the OLT 20 of a typical PSPON 10 transmits downstream traffic destined for one or more of ONUs 50 in $\lambda_d$. OLT 20 may also transmit downstream analog video traffic for broadcast to ONUs 50 in $\lambda_v$. Traffic in wavelengths $\lambda_d$ and $\lambda_v$ is combined at OLT 20 and travels over optical fiber 30 to RN 40. RN 40 splits the downstream traffic into a suitable number of copies and forwards each copy to a corresponding ONU. Each ONU receives a copy of the downstream traffic in $\lambda_d$ and $\lambda_v$ and processes the signal. Suitable addressing schemes may be used to identify which traffic is destined for which ONU 50. Each ONU 50 may also transmit upstream traffic in $\lambda_u$ along fiber 30 according to a suitable time-sharing protocol (such that upstream traffic does not collide). RN 40 receives the upstream traffic from each ONU 50 and combines the traffic from each ONU 50 into one signal. RN 40 forwards the signal over fiber 30 to OLT 20. OLT 20 receives the signal and processes it.

Although PSPONs may offer much greater bandwidth than typical access networks such as DSL networks, bandwidth requirements are projected to exceed even the increased capacity offered by typical PSPONs. For example, some streaming video and online gaming applications presently require bit rates of approximately one to ten MB/s, and some IP high definition television and video-on-demand systems presently require bit rates of approximately twenty MB/s. Future demands for bandwidth are projected to be even greater. In the past, network operators have met increased demand by increasing the transmission rate of transmitters, such as, for example, by upgrading from BPONs to GPONs. However, a switch to a wavelength division multiplexing PON (WDMPON), in which each ONU would receive and transmit traffic over a dedicated downstream and upstream wavelength, respectively, would dramatically increase network capacity and satisfy the demand for bandwidth for many years to come.

Figure 2:
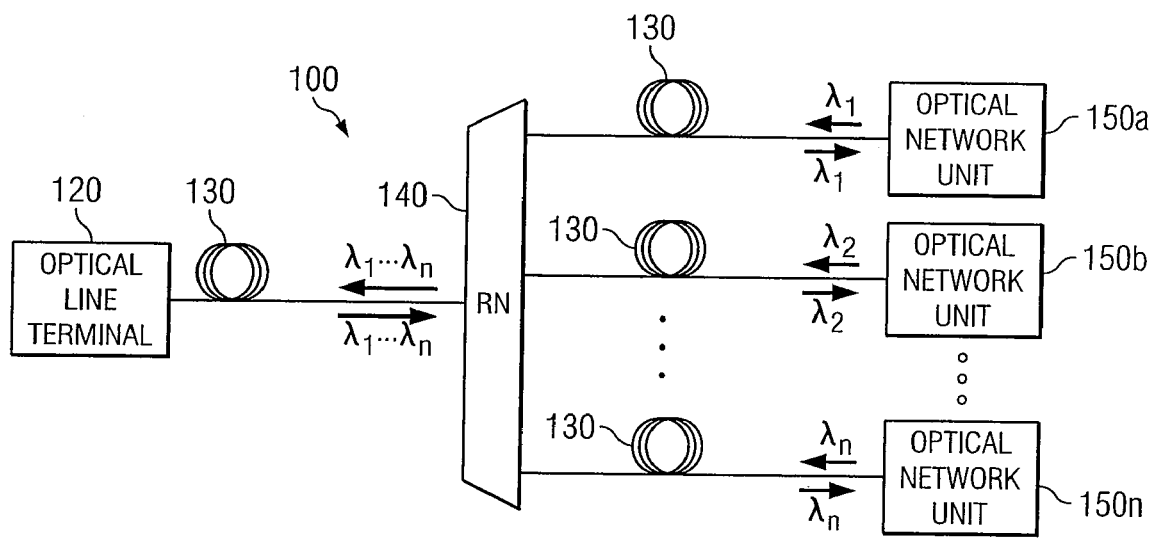
FIG. 2 is a diagram illustrating an example WDMPON.

FIG. 2 is a diagram illustrating an example WDMPON 100. WDMPON 100 may include any suitable WDMPON (also referred to as WPON) or Dense WDMPON (DWDMPON). WDMPON 100 includes OLT 120, optical fiber 130, RN 140, and ONUs 150. Common features of WDMPONs include dedicating at least one upstream and one downstream wavelength for each ONU. Thus, WDMPONs are operable to transmit downstream traffic over multiple, dedicated wavelengths from an OLT, each wavelength corresponding to a particular ONU. In addition, each ONU is operable to transmit upstream traffic over a dedicated wavelength, separate from the wavelengths used by the other ONUs 150. Thus, the upstream and downstream bandwidth of WDMPON 100 is N times greater than the bandwidth of a PSPON, where N equals the number of dedicated wavelengths over which traffic is carried in each direction.

Referring back to FIG. 2, OLT 120 of example WDMPON 100 may reside at the carrier's central office and includes multiple transmitters (equal to the number of ONUs 150), each operable to transmit a dedicated downstream wavelength, one of $\lambda_1$-$\lambda_n$, carrying traffic for a corresponding ONU 150. OLT 120 also includes multiple receivers (equal to the number of ONUs 150), each operable to receive a dedicated upstream wavelength, one of $\lambda_1$-$\lambda_n$, carrying traffic from a corresponding ONU 150. OLT 120 also includes a multiplexer operable to multiplex the downstream wavelengths transmitted by the transmitters of OLT 120 and demultiplex the upstream signal (comprising traffic in multiple wavelengths) that OLT 120 receives from ONUs 150. After demultiplexing the signal, the multiplexer is operable to forward the traffic in each wavelength to a corresponding receiver in OLT 120. It should be noted that $\lambda_1$-$\lambda_n$ in the downstream direction may (or may not) be transmitted at the same wavelengths as $\lambda_1$-$\lambda_n$ traveling upstream (despite having similar designation for simplicity of this discussion).

Optical fiber 130 may include any suitable fiber and is operable to carry upstream and downstream traffic. In certain WDMPONs 100, optical fiber 130 may comprise, for example, bidirectional optical fiber. In other WDMPONs 100, optical fiber 130 may comprise two distinct fibers. RN 140 of WDMPON 100 comprises any suitable multiplexer and connects OLT 120 to ONUs 150. RN 140 is located in any suitable location and has one port to receive a downstream signal comprising multiple wavelengths from OLT 120 and multiple ports (equal to the number of ONUs 150) to forward traffic in each wavelength to a corresponding ONU. RN 140 is operable to demultiplex a downstream signal such that each ONU 150 receives traffic over its dedicated downstream wavelength, one of $\lambda_1$-$\lambda_n$. RN 140 is also operable to multiplex upstream traffic carried over $\lambda_1$-$\lambda_n$ into a single upstream signal, the traffic in each wavelength corresponding to one ONU 150. RN 140 is operable to forward the upstream signal to OLT 120.

ONUs 150 may include any suitable optical network unit or ONT and may serve residential and/or commercial customers. Each ONU 150 comprises one receiver to receive downstream traffic over its dedicated downstream wavelength from OLT 120. Each ONU 150 also comprises one transmitter to transmit upstream traffic over its dedicated upstream wavelength. Each ONU 150 may be capable of transmitting and receiving traffic in any wavelength used in WDMPON 100 such that the wavelengths assigned to the various ONUs may be changed without having to change the transmitting and receiving components in the ONUs. An ONU capable of operating in this fashion is typically referred to as a "colorless" ONU.

In operation, each transmitter in OLT 120 transmits downstream traffic for a corresponding ONU 150 over a dedicated wavelength, a corresponding one of $\lambda_1$-$\lambda_n$. The downstream wavelengths are multiplexed at OLT 150 into one signal, and the signal travels over optical fiber 130 to RN 140. RN 140 receives the signal and demultiplexes the signal into its constituent wavelengths, forwarding the traffic in each wavelength to a corresponding ONU 150. Each ONU 150 receives traffic over the associated wavelength and processes the traffic. Each ONU 150 may also transmit upstream traffic over a dedicated wavelength, one of $\lambda_1$-$\lambda_n$, along fiber 130. RN 140 receives upstream traffic from all of the ONUs 150 carried over these dedicated wavelengths and multiplexes the traffic from all of the ONUs 150 into one signal. RN 140 forwards the signal over fiber 130 to OLT 120. OLT 120 receives the signal and demultiplexes it into its constituent wavelengths. The demultiplexer of OLT 120 forwards the traffic in each wavelength to a corresponding receiver, and OLT 120 processes the traffic.

As is easily observed in the WDMPON 100 of FIG. 2, WDMPONs dramatically increase bandwidth at the access network by multiplying network capacity by the number of wavelengths carried. However, the increase in bandwidth using WDMPONs comes at a significant cost. For example, WDMPONs require highly stable WDM components to distribute narrowly spaced dedicated wavelengths (or channels) from the OLT to each ONU and from each ONU to the OLT. For example, the multiplexer/demultiplexer at RN 140 and the receivers and transmitter at each ONU 150 must all be precisely tuned. In practice, the density of the channels requires wavelength stabilized transmitters and temperature insensitive multiplexers, both of which add significantly to the cost of the network. Many WDMPON components (including colorless ONUs) are also expensive and as-of-now unproven technologies whose reliability has not been determined. Thus, according to some estimates, implementing a WDMPON may cost two to five times as much as a GPON and WDMPON may be unreliable.

In addition to these high costs, replacing current networks with WDMPONs would also inefficiently increase network capacity beyond present needs. In fact, WDMPONs are expected to exceed demand for many years. Thus, many network operators would prefer to make gradual upgrades from existing networks, such that increases in bandwidth (and thus the cost of such increases) correspond more closely with increases in consumer demand. These operators may eventually upgrade to a WDMPON after one or more intermediary upgrades, thereby incurring the cost of WDMPON bandwidth over a greater period of time and according to consumer demand. Thus, a need exists for a hybrid PON (HPON) that offers a simple and efficient upgrade from existing PSPONs and that may easily and efficiently be upgraded (to, for example, a WDMPON).

Figure 3:
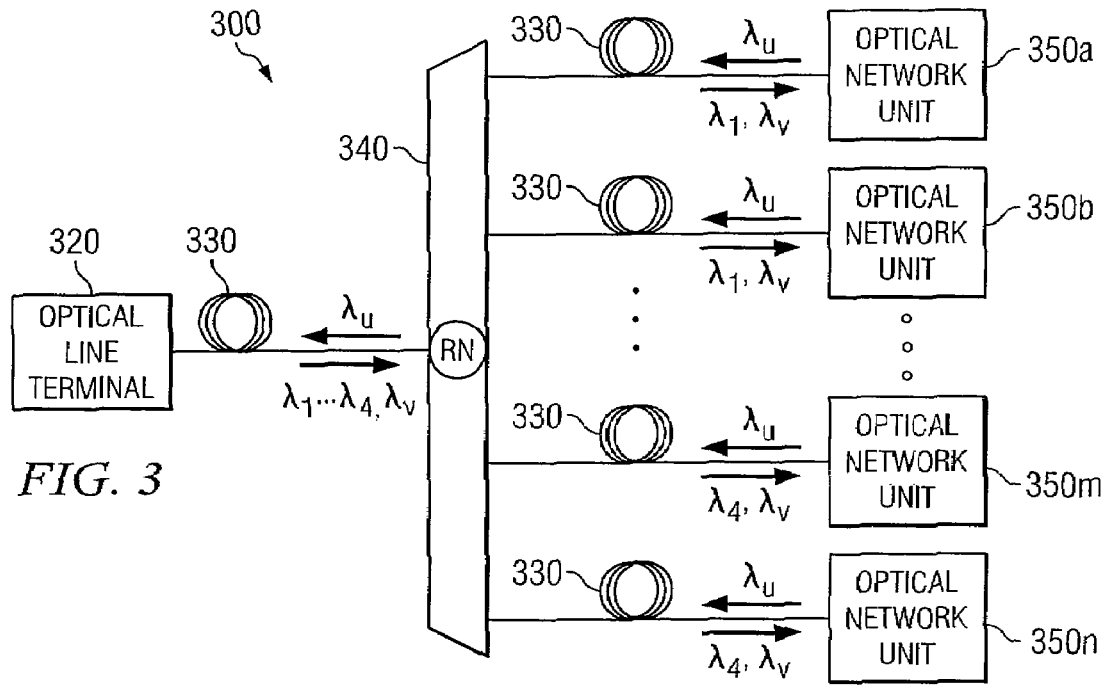
FIG. 3 is a diagram illustrating an example Wavelength Shared Hybrid PON (WS-HPON)

FIG. 3 is a diagram illustrating an example Wavelength Shared Hybrid PON (WS-HPON) 300. Example WS-HPON 300 comprises OLT 320, optical fiber 330, RN 340, and ONUs 350. Example WS-HPON 300, a hybrid between a PSPON and a WDMPON, provides a cost-efficient upgrade solution for many network operators. Example WS-HPON 300 provides greater downstream capacity cost-efficiently by having groups of two or more ONUs 350 share downstream WDM wavelengths, thus reducing the need for densely multiplexed wavelengths and the need for highly stable multiplexers and transceivers. It should be noted that an HPON generally refers to any suitable PON that is not a full WDM-PON but that is operable to route downstream traffic in particular wavelengths to particular ONUs (and to transmit upstream traffic in any suitable manner). An HPON may include both an HPON that transmits downstream traffic in a plurality of wavelengths each shared by a group of wavelength-sharing ONUs (a WS-HPON) and an HPON that transmits downstream traffic in a unique wavelength for each ONU (retaining PSPON characteristics in the upstream direction).

In the illustrated example, ONUs 350a-350n may share $\lambda_1$-$\lambda_4$. Traffic in $\lambda_v$ is broadcast to all ONUs. It should be noted that any suitable number of ONUs may be associated with one OLT. Additionally, any suitable number of ONUs may share one or more wavelengths in a WS-HPON. Using shared wavelengths in WS-HPON permits the use of less costly optics components (such as, for example, low-cost CWDM optics), allowing for an upgrade in capacity at a lower cost than other HPONs or WDMPON.

For example, sharing downstream wavelengths in WS-HPON 300 reduces the cost and stability requirements of the multiplexer and transmitter/receiver components in the network. Due to the sharing of wavelengths, the spacing between WDM wavelengths may be increased to relax the specifications of wavelength selective elements and to relax the requirements for transmitter wavelength stability and temperature stability of passive components. By using less expensive components to provide a desired increase in downstream bandwidth, WS-HPON 300 is a much more attractive upgrade solution for many network operators than are other HPONs. In addition, WS-HPON 300 is also upgradeable to WDMPON, allowing migration to WDMPON if and when there is sufficient demand to justify the cost for the increase in bandwidth.

OLT 320 of WS-HPON 300 (which may be an example of an upstream terminal) may reside at the carrier's central office and comprises four transmitters operable to transmit downstream traffic over $\lambda_1$-$\lambda_4$, which are to be shared by groups of ONUs 350. OLT 320 may also comprise an additional transmitter operable to transmit an analog video signal in $\lambda_v$ for broadcast to all ONUs 350. OLT 320 may also comprise a multiplexer operable to multiplex the wavelengths transmitted by the transmitters of OLT 320. OLT 320 may also comprise a receiver operable to receive upstream traffic in wavelength $\lambda_u$, which is time-shared by ONUs 350. It should be noted that although the illustrated embodiment shows only four downstream wavelengths to be shared by ONUs 350, any suitable number of downstream wavelengths may be transmitted at OLT 320 and shared by groups of ONUs 350. In addition, any suitable number of downstream wavelengths may be transmitted at OLT 320 and the traffic in these wavelengths broadcast to all ONUs 350 (and not just the traffic in $\lambda_v$, as illustrated). It should be further noted that traffic in any suitable number of upstream wavelengths may be received at OLT 320 and an upstream wavelength need not be time-shared by all ONUs (for example, a separate upstream wavelength may be time-shared by each group of downstream, wavelength-sharing ONUs).

Optical fiber 330 may comprise any suitable fiber to carry upstream and downstream traffic. In certain WS-HPONs 300, optical fiber 330 may comprise, for example, bidirectional fiber. In other WS-HPONs 300, optical fiber 330 may comprise two distinct fibers.

RN 340 of WS-HPON 300 may comprise a multiplexer and a power splitter. The multiplexer is operable to demultiplex downstream wavelengths $\lambda_1$-$\lambda_4$ and forward traffic in each of these wavelengths to a corresponding group of wavelength-sharing ONUs 350. The power splitter is operable to receive and split traffic in downstream wavelength $\lambda_v$ (if applicable) for broadcast to all ONUs 350. With regard to upstream traffic, the power splitter of RN 340 is also operable to receive and combine traffic in time-shared $\lambda_u$ from ONUs 350 into one signal. RN 340 is further operable to forward the upstream signal to OLT 320. It should be noted that although RN 340 is referred to as a remote node, "remote" refers to RN 340 being communicatively coupled to OLT 320 and ONUs 350 in any suitable spatial arrangement. A remote node may also generally be referred to as a distribution node.

ONUs 350 (which may be examples of downstream terminals) may comprise any suitable optical network unit or ONT and may serve residential and/or commercial customers. There may be any suitable number of ONUs. Each ONU 350 may comprise one receiver to receive traffic over a shared wavelength, one of $\lambda_1$-$\lambda_4$, and one receiver to receive traffic over $\lambda_v$ (if applicable). Each ONU 350 may also comprise one transmitter to transmit upstream traffic over time-shared $\lambda_u$. Each ONU 350 may thus comprise a triplexer.

In operation, the transmitters in OLT 320 transmit downstream traffic over $\lambda_1$-$\lambda_4$, which are to be shared by groups of ONUs 350, and (in certain cases) one transmitter in OLT 320 transmits downstream traffic to be broadcast to all ONUs 350 over $\lambda_v$. Traffic in wavelengths $\lambda_1$-$\lambda_4$ and $\lambda_v$ is multiplexed at OLT 320 into one signal, and the signal travels over optical fiber 330 to RN 340. RN 340 filters the traffic in $\lambda_v$ out of the signal and forwards the traffic to the power splitter where it is split for broadcast to all ONUs 350. At the multiplexer, RN 340 demultiplexes the signal comprising the traffic in the remaining wavelengths ($\lambda_1$-$\lambda_4$) and forwards the traffic in each wavelength, one of $\lambda_1$-$\lambda_4$, to its corresponding group of wavelength-sharing ONUs 350. Each ONU 350 receives traffic over one or more of the wavelengths that it shares with other ONUs 350 and processes the traffic (according to a suitable protocol). Each ONU 350 may also receive and process traffic over $\lambda_v$. In the upstream direction, each ONU 350 time-shares use of $\lambda_u$ according to a suitable protocol. RN 340 receives upstream traffic carried over time-shared $\lambda_u$ from each of the ONUs 350 and combines the traffic into one signal using the power splitter. RN 340 forwards the combined signal over fiber 230 to OLT 220. OLT 220 receives the signal at its receiver and processes the traffic.

Modifications, additions, or omissions may be made to the WS-HPON 300 described without departing from the scope of the invention. The components of the WS-HPON 300 described may be integrated or separated according to particular needs. Moreover, the operations of the WS-HPON 300 described may be performed by more, fewer, or other components.

Referring back to the discussion of PSPONs, PSPONs may transmit downstream traffic over two wavelengths $\lambda_d$ and $\lambda_v$, and upstream traffic over time-shared wavelength $\lambda_u$. Many typical PSPONs are not easily upgradeable to an HPON. Upgrades of typical PSPONs to HPONs require a disruption in service. For example, in existing PSPONs, fiber cuts are required to add or modify components, disrupting service in existing networks. Thus, a need exists for an easily upgradeable PSPON.

Figure 4:
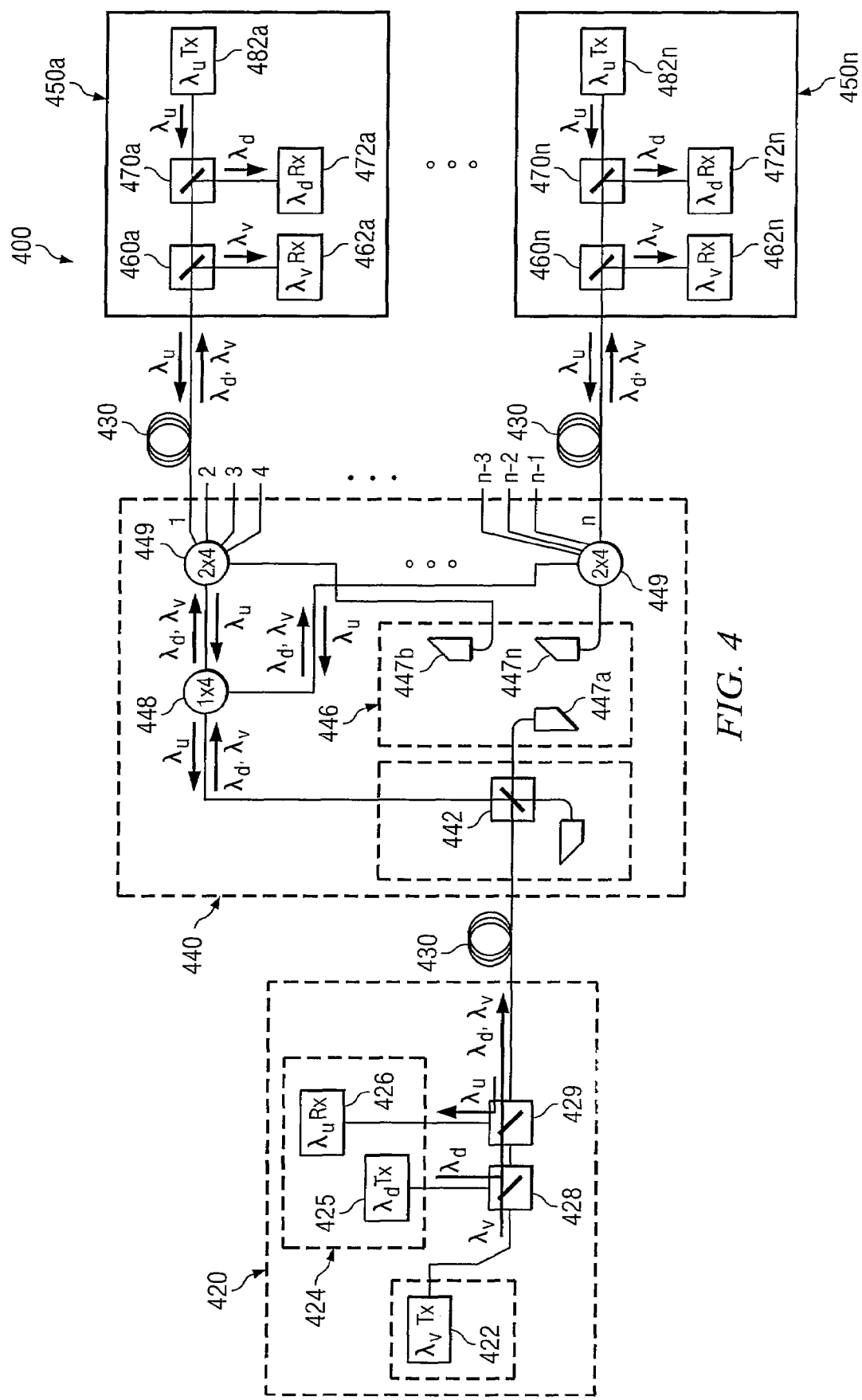
FIG. 4 is a diagram illustrating an example upgradeable PSPON.

FIG. 4 is a diagram illustrating an example upgradeable PSPON 400. Example PSPON 400 comprises OLT 420, optical fiber 430, RN 440, and ONUs 450. The upgradeability of upgradeable PSPON 400 may be provided for any PSPON such as those described above in conjunction with PSPON 10 of FIG. 1.

OLT 420 of example upgradeable PSPON 400 (which may be an example of an upstream terminal) comprises a transmitter 422, transceiver 424 comprising transmitter 425 and receiver 426, and filters 428 and 429. Transmitter 422 may comprise any suitable transmitter and is operable to transmit traffic over wavelength $\lambda_v$. Transmitter 422 of typical PSPONs may transmit analog video traffic (although transmitter 422 may alternatively transmit digital data traffic). Transmitter 425 of transceiver 424 may comprise any suitable transmitter operable to transmit traffic over wavelength $\lambda_d$. Transmitter 425 of typical PSPONs may transmit digital data traffic. Transmitters 422 and 425 may transmit at any suitable bit rate. Receiver 426 of transceiver 424 may comprise any suitable receiver operable to receive upstream traffic from ONUs 450 carried over $\lambda_u$. Filter 428 comprises any suitable filter operable to pass the traffic in $\lambda_v$ and direct the traffic in $\lambda_d$ to RN 440. The traffic in $\lambda_d$ and $\lambda_v$ may also be combined into one signal at filter 428. Filter 429 comprises any suitable filter operable to pass the traffic in downstream wavelengths $\lambda_d$ and $\lambda_v$ to RN 440 and direct the traffic in upstream wavelength $\lambda_u$ to receiver 426.

Optical fiber 430 may comprise any suitable fiber to carry upstream and downstream traffic. In particular example upgradeable PSPON 400, optical fiber 430 may comprise bidirectional optical fiber. Alternatively, optical fiber 430 may comprise one fiber for downstream traffic and one fiber for upstream traffic.

RN 440 comprises a filter 442, a lead termination section 446, a primary power splitter 448, and secondary power splitters 449. RN 440 is configured to be easily upgraded to implement a WS-HPON and, eventually, a WDMPON. Filter 442 comprises any suitable filter and may include, for example, a band splitting filter. Filter 442 is operable to direct the traffic in downstream wavelengths that are to be split and broadcast by primary power splitter 448 and pass the traffic in downstream wavelengths that are to be demultiplexed (once the system is upgraded to a WS-HPON). Filter 442 is also operable to direct the traffic in upstream wavelengths to OLT 420. Before an upgrade from a PSPON, filter 442 directs the traffic in $\lambda_d$ and $\lambda_v$ to primary power splitter 448 for broadcast, and directs the traffic in $\lambda_u$ from primary power splitter 448 to OLT 420. Filter 442 may be coupled to a termination point that may terminate the traffic in wavelengths forwarded to it by filter 442 (although the termination point may be internal to filter 442 in alternate example networks). Although the illustrated example includes only one filter 442, example upgradeable PSPONs may comprise any suitable number of filters (and optional switches) to seamlessly upgrade the network.

Lead termination section 446 of RN 440 allows for an easy upgrade of network 400 by inserting a wavelength router such as a multiplexer for performing WDM. Lead termination section 446 comprises a plurality of fiber leads. One input fiber lead 447a is coupled to filter 442, and multiple output fiber leads 447b-447n are coupled to corresponding secondary power splitters 449. Before an upgrade, leads 447a-447n of lead termination section 446 may be configured such that they terminate any signal that they may receive. After an upgrade, leads 447a-447n may be coupled to corresponding multiplexer ports, allowing for easy integration of a multiplexer (to perform WDM) into the network, as described in more detail below in conjunction with FIG. 5. There may be any suitable number of leads in network 400.

Primary power splitter 448 comprises any suitable power splitter, such as an optical coupler, and is operable to split a downstream optical signal into a suitable number of copies and to combine a plurality of upstream optical signals into one signal. In the illustrated example, primary power splitter 448 is operable to broadcast the traffic in $\lambda_d$ and $\lambda_v$ by splitting the downstream signal comprising these wavelengths into four copies (which are then forwarded to secondary power splitters 449 for eventual receipt by all ONUs 450). Primary power splitter 448 is also operable to combine upstream traffic transmitted over $\lambda_u$ by ONUs 450 into one signal. Although primary power splitter 448 is illustrated as a 1×4 power splitter, primary power splitter 448 may comprise any suitable splitter or combination of splitters such that each ONU 450 receives a copy of the traffic in $\lambda_d$ and $\lambda_v$ and such that the upstream signals from ONUs 450 are combined for communication to OLT 420. A wavelength router and a power splitter may each be members of a group referred to as distributors.

Each secondary power splitter 449 comprises any suitable power splitter, such as an optical coupler or combination of couplers, operable to split a downstream signal and combine an upstream signal. In the downstream direction, each secondary power splitter 449 is operable to receive a signal from primary power splitter 448 and distribute the combined signal to a corresponding group of ONUs 450 (in addition, after upgrade to WS-HPON, secondary power splitters 449 serve to combine signals received from primary power splitter 448 and from the multiplexer inserted into lead termination section 446, as described below, and to distribute this combined signal to ONUs 450). Pre-upgrade, secondary power splitters 449 only receive a signal from primary power splitter 448 and do not receive a signal from lead termination section 446. After a multiplexer is added to the network, however, secondary power splitters 449 may receive a signal from primary power splitter 448 and the multiplexer (coupled to lead termination section 446). In the upstream direction, each secondary power splitter 449 is operable to receive and combine traffic over time-shared $\lambda_u$ from a corresponding group of ONUs 450, split the combined traffic into two copies, and distribute one copy to lead termination section 446 and one copy to primary power splitter 448. In the illustrated example, the copy passed to lead termination section 446 is terminated, and the copy passed to primary power splitter 448 is combined with other upstream signals (from the other secondary power splitters 449) and forwarded to filter 442. It should be noted that although secondary power splitters 449 are represented by 2×4 couplers in the illustrated example, any suitable coupler (or combination of couplers) may be used.

Each ONU 450 (which may be an example of a downstream terminal) may comprise any suitable ONU or ONT. In the illustrated example network, ONU 450 comprises a filter 460, a receiver 462, a filter 470, a receiver 472, and a transmitter 482. Since each ONU 450 in the illustrated example comprises two receivers and one transmitter, it may be referred to as a triplexer. However, any suitable number of transmitters and/or receivers may reside at each ONU. Each filter 460 may comprise any suitable filter operable to direct traffic in $\lambda_v$ to a corresponding receiver 462 and to pass traffic in $\lambda_d$ in the downstream direction and $\lambda_u$ in the upstream direction. Each receiver 462 may include any suitable receiver operable to receive traffic in $\lambda_v$ from a corresponding filter 460 and process the traffic. Each filter 470 may comprise any suitable filter operable to direct the traffic in $\lambda_d$ to a corresponding receiver 472 and to pass the traffic in $\lambda_u$ in the upstream direction. Each receiver 472 may include any suitable receiver operable to receive the traffic in $\lambda_d$ from a corresponding filter 470 and process the traffic. Each transmitter 482 may comprise any suitable transmitter operable to transmit the traffic in $\lambda_u$ upstream. ONUs 450 may time-share $\lambda_u$ using a suitable communication protocol to avoid collision of upstream traffic. It should be noted that any suitable number of ONUs 450 may be implemented in PSPON 400.

In operation, in the downstream direction, transmitter 422 of OLT 420 may transmit downstream traffic (for example, analog video) over $\lambda_v$, and transmitter 425 may transmit downstream traffic (for example, digital data) over $\lambda_d$. Filter 428 receives the two signals and passes the traffic in $\lambda_v$ and directs the traffic in $\lambda_d$ (thereby combining the traffic into one signal) to filter 429. Filter 429 receives the combined signal comprising the traffic in $\lambda_v$ and $\lambda_d$ and allows the signal to pass over fiber 430 to filter 442 of RN 440. Filter 442 receives the signal comprising the traffic in $\lambda_d$ and $\lambda_v$ and directs the traffic in both wavelengths to primary power splitter 448. Primary power splitter 448 receives the signal comprising the traffic in $\lambda_d$ and $\lambda_v$, splits the traffic into multiple copies (in this example, four copies), and forwards each copy to a corresponding secondary power splitter 449. Each secondary power splitter 449 receives a copy of the signal comprising the traffic in $\lambda_d$ and $\lambda_v$, splits the copy into multiple additional copies (in this example, four additional copies of each copy), and passes each additional copy over fiber 430 to a corresponding ONU 450. Each ONU 450 receives a copy of the signal comprising the traffic in $\lambda_d$ and $\lambda_v$ at a corresponding filter 460. Each filter 460 passes the traffic in $\lambda_d$ to filter 470 and directs the traffic in $\lambda_v$ to receiver 462. Filter 470 receives the traffic in $\lambda_d$ and directs it to receiver 472. Receivers 462 and 472 receive and process the traffic in $\lambda_v$ and $\lambda_d$, respectively.

In the upstream direction, transmitter 482 of each ONU 450 transmits traffic over time-shared $\lambda_u$. The traffic in $\lambda_u$ passes through filters 470 and 460 and over fiber 430 to RN 440. RN 440 receives the traffic in $\lambda_u$ from each ONU 450 at a corresponding secondary power splitter 449. Each secondary power splitter 449 splits the signal into two copies, and forwards one copy to lead termination section 446 and the other copy to primary power splitter 448. Lead termination section 446 receives a copy of the traffic in $\lambda_u$ from each secondary power splitter 449 and terminates the traffic. Primary power splitter 448 receives a copy of the upstream signal from each secondary power splitter 449, combines the signals into one signal, and forwards the combined signal to filter 442. Filter 442 receives the signal comprising the traffic in $\lambda_u$ and directs the signal to OLT 420. The signal travels over fiber 430 to filter 429 of OLT 420. Filter 429 directs the traffic in $\lambda_u$ to receiver 426. Receiver 426 receives the traffic in $\lambda_u$ and processes it.

Therefore, PSPON 400 operates similarly to PSPON 10 (in that both broadcast downstream signals and time-share an upstream signal). However, unlike PSPON 10, PSPON 400 allows for an easy upgrade to a WS-HPON. The optical fiber connecting OLT 420 and ONTs 450 need not be cut to perform this upgrade (thereby avoiding network downtime and the risk of contamination of connectors), and the upgrade to a multiplexer at RN 440 and to multiple transmitters and a multiplexer at OLT 420 may be performed almost completely in-service.

Modifications, additions, or omissions may be made to the PSPON 400 described without departing from the scope of the invention. The components of the PSPON 400 described may be integrated or separated according to particular needs. Moreover, the operations of the PSPON 400 described may be performed by more, fewer, or other components. As examples only, alternative networks may comprise redundant lines from the OLT suitably coupled to the RN, the RN may provide any suitable number of outputs to the ONUs, and any suitable number of wavelength routers may be added to the RN (making suitable changes to the network).

Figure 5:
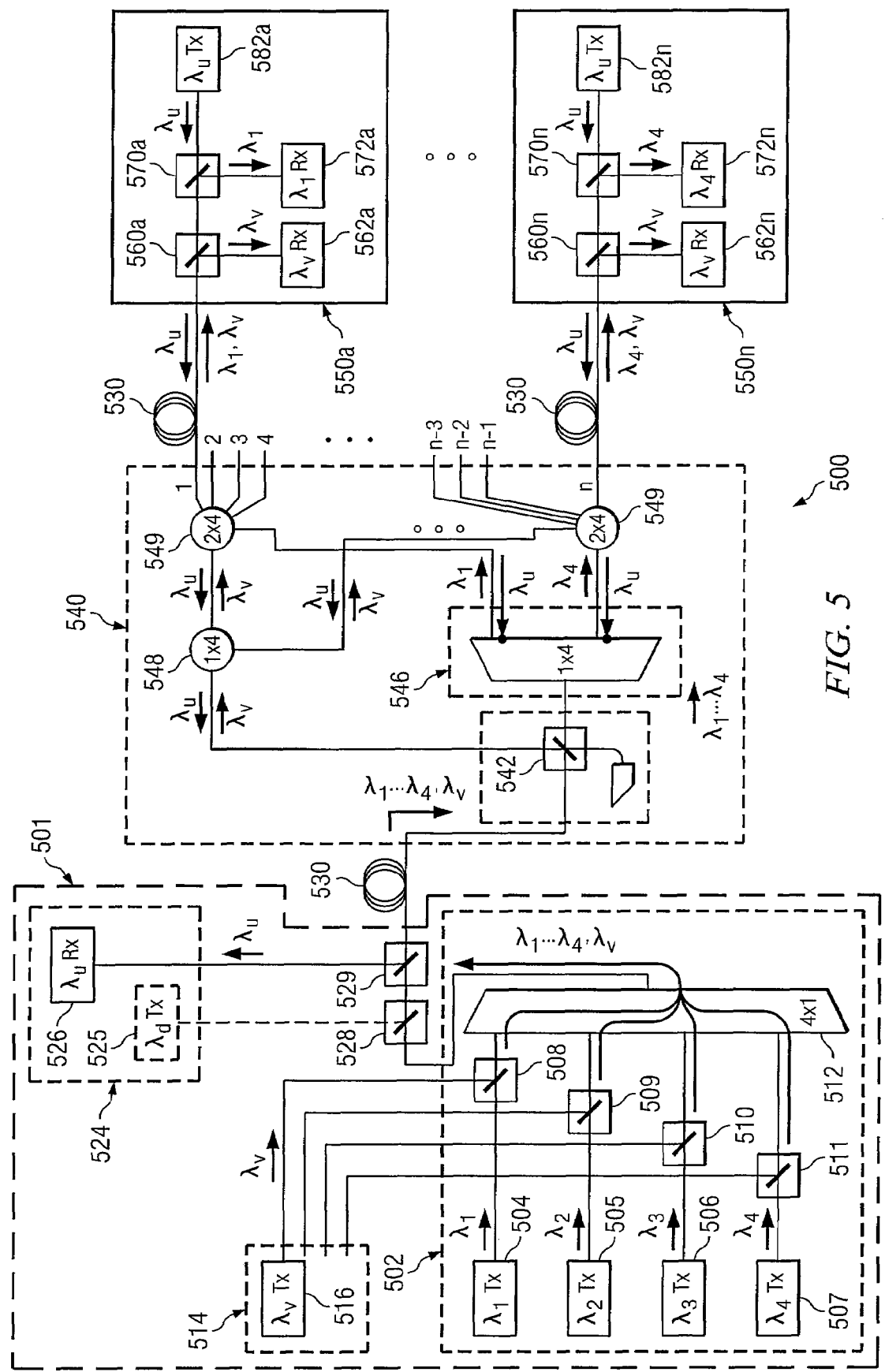
FIG. 5 is a diagram illustrating in more detail the example WS-HPON of FIG. 3.

FIG. 5 is a diagram illustrating in more detail the example WS-HPON of FIG. 3. The example WS-HPON 500 of FIG. 5 also illustrates an upgrade from upgradeable PSPON 400 of FIG. 4. As described above, WS-HPONs may be more attractive upgrade options than many other HPONs or WDMPONs. By sharing downstream WDM wavelengths, WS-HPONs provide an increase in bandwidth over PSPONs at a much lower price than many other HPONs or WDMPONs.

WS-HPON 500 comprises OLT 501, fiber 530, RN 540, and ONUs 550. OLT 501 (which may be an example of an upstream terminal) comprises WDM transmission section 502, upgradeable transmission section 514, PSPON transceiver 524, and filters 528 and 529. WDM transmission section 502 comprises transmitters 504-507, filters 508-511, and multiplexer 512. Each transmitter 504-507 may comprise any suitable transmitter and is operable to transmit traffic over a corresponding wavelength, $\lambda_1$-$\lambda_4$, respectively. It should be noted that although example WS-HPON 500 does not provide WDM for upstream traffic, and thus new receivers are not needed in conjunction with new transmitters 504-507, it may be economical to implement transceivers (transmitter and receiver) in WDM transmission section 502 instead of only transmitters (in anticipation of a further upgrade to WDM upstream). The cost of transceivers is typically less than the cost of a separate transmitter and receiver, thus reducing the eventual overall cost to upgrade to a WDMPON. It should further be noted that although only four new transmitters are illustrated in example WS-HPON 500, any suitable number of transmitters (or transceivers) may be included.

Each filter 508-511 may comprise any suitable filter and is operable to pass the traffic in $\lambda_1$-$\lambda_4$, respectively. In addition, filter 508 is operable to direct the traffic in wavelength $\lambda_v$ from transmitter 516 of upgradeable transmission section 514 to multiplexer 512 (such that the traffic in both $\lambda_1$ and $\lambda_v$ is forwarded to multiplexer 512 over the same fiber). In fact, each filter 508-511 may be coupled to upgradeable transmission section 514 (through a corresponding fiber), allowing for an easy upgrade if more transmitters are added to WS-HPON 500. The fibers coupling filters 509-511 and upgradeable transmission section 514 do not carry a signal in the illustrated example WS-HPON 500 of FIG. 5, as no new transmitters have been added to upgradeable transmission section 514. However, filters 509-511 may be operable to direct the traffic in the corresponding wavelengths associated with potential transmitters added to upgradeable transmission section 514. After the upgrade, filters 509-511 would direct the traffic in the corresponding wavelength from upgradeable transmission section 514 in a similar manner as filter 508 directs the traffic in $\lambda_v$.

Upgradeable transmission section 514 comprises transmitter 516 and a set of three terminating fiber leads. Transmitter 516 comprises any suitable transmitter and is operable to transmit traffic over $\lambda_v$. Transmitter 516 may be the same as transmitter 422 of network 400, and thus $\lambda_v$ of WS-HPON 500 may be the same as $\lambda_v$ of network 400. Transmitter 516 may transmit analog video traffic over $\lambda_v$. The three terminating fiber leads may be coupled to new transmitters if new transmitters are added to upgrade example WS-HPON 500. As discussed above, each terminating lead is coupled to a corresponding filter, one of filters 509-511. It should be noted that although only three fiber leads are illustrated, any suitable number of leads may be added in anticipation of further upgrades of WS-HPON 500.

Multiplexer 512 comprises any suitable multiplexer/demultiplexer (and may be considered a wavelength router) and is operable to combine the traffic in $\lambda_1$-$\lambda_4$ and $\lambda_v$ into one signal. In the illustrated example 500, multiplexer 512 comprises a cyclic multiplexer operable to receive and combine the traffic in more than one wavelength through each port (such as the traffic in $\lambda_1$ and $\lambda_v$ through the first port). In other example networks, multiplexer 512 may be a typical N×1 multiplexer operable to receive only the traffic in one wavelength through each port. Where the traffic in a large number of wavelengths is being multiplexed, a cyclic multiplexer may prove more cost-efficient than a multiplexer having N ports. Furthermore, a cyclic multiplexer may not need to be replaced to add more ports (as with typical multiplexers) if more transmitters are added to the OLT to upgrade WS-HPON 500. For example, WS-HPON 500 may be upgraded to transmit traffic in eight downstream wavelengths, including $\lambda_1$-$\lambda_4$ and additional wavelengths $\lambda_5$-$\lambda_8$. In such an upgrade, cyclic multiplexer 512 need not be replaced to receive the traffic in the four additional wavelengths, as the multiplexer's first port may receive the traffic in $\lambda_1$ and $\lambda_5$, the second port may receive the traffic in $\lambda_2$ and $\lambda_6$, the third port may receive the traffic in $\lambda_3$ and $\lambda_7$, and the fourth port may receive the traffic in $\lambda_4$ and $\lambda_8$. In the contrasting situation in which non-cyclic multiplexers are used, a 4×1 multiplexer would need to be replaced by an 8×1 multiplexer to receive the traffic in the four additional wavelengths.

PSPON transceiver 524 comprises transmitter 525 and receiver 526. Transmitter 525 may be the same transmitter as transmitter 425 of FIG. 4. However, in WS-HPON 500 of FIG. 5, transmitter 525 may no longer transmit traffic over the network, and may be replaced by transmitters 504-507 of WDM transmission section 502. Transmitter 525 may, in particular embodiments, remain in place to provide limited protection for failure of the downstream WDM transmitters or to keep the network operational at lower bandwidth during particular upgrades of the network (such as, for example, an upgrade of the multiplexer in the RN). Receiver 526 of transceiver 524 may comprise any suitable receiver (and may be the same as receiver 426 of network 400) and is operable to receive upstream traffic carried over time-shared $\lambda_u$.

Filter 528 comprises any suitable filter operable to pass the traffic in $\lambda_1$-$\lambda_4$ and $\lambda_v$ to filter 529. Filter 528 may also be operable to pass the traffic in additional wavelengths to be transmitted in upgrades of WS-HPON 500. Although illustrated in-line in WS-HPON 500, in other example embodiments, filter 528 may be switched out of the line using a suitable switch.

Filter 529 comprises any suitable filter operable to pass the traffic in $\lambda_1$-$\lambda_4$ and $\lambda_v$ over fiber 530 to RN 540. Filter 528 may also be operable to pass traffic in additional wavelengths to be transmitted in upgrades of WS-HPON 500. In addition, filter 529 is operable to direct traffic in upstream wavelength $\lambda_u$ to receiver 526.

Optical fiber 530 may comprise any suitable fiber to carry upstream and downstream traffic. In certain WS-HPONs 500, optical fiber 530 may comprise, for example, bidirectional optical fiber. In other WS-HPONs 500, optical fiber 530 may comprise two distinct fibers, one carrying downstream traffic and the other carrying upstream traffic.

RN 540 comprises filter 542, multiplexer 546, primary power splitter 548, and secondary power splitters 549. RN 540 is operable to receive the traffic in $\lambda_1$-$\lambda_4$ and $\lambda_v$ from OLT 501, filter out and broadcast the traffic in $\lambda_v$, and demultiplex and forward the traffic in $\lambda_1$-$\lambda_4$ to the ONUs in corresponding groups of wavelength-sharing ONUs 550. RN 540 is further operable to receive from ONUs 550 upstream signals carried over time-shared wavelength $\lambda_u$, combine these signals, and forward the combined traffic in $\lambda_u$ to OLT 501. To reiterate, WS-HPON 500 is operable to allow wavelength-sharing among groups of ONUs 550, thereby increasing network capacity while avoiding the costly components of a full downstream WDM network such as that in other HPONs or WDM-PON.

Filter 542 may comprise any suitable filter operable to receive a signal comprising traffic in $\lambda_1$-$\lambda_4$ and $\lambda_v$, pass the traffic in $\lambda_1$-$\lambda_4$ to multiplexer 546, and direct the traffic in $\lambda_v$ to primary power splitter 548. Although filter 542 in the illustrated example includes only one filter, filter 542 may comprise any suitable number of filters (coupled to optional switches) to facilitate an upgrade of the network. In the upstream direction, filter 542 is operable to receive the traffic in $\lambda_u$ and direct it toward OLT 501.

Multiplexer 546 may include any suitable multiplexer/demultiplexer (and may be considered a wavelength router) and is operable to receive the signal comprising the traffic in $\lambda_1$-$\lambda_4$ and demultiplex the signal. Although in the illustrated example, multiplexer 546 is a 1×4 multiplexer, in alternative networks, multiplexer 546 may have any suitable number of ports. Also, in alternative networks, multiplexer 546 may comprise two or more separate multiplexers receiving downstream signals from one or more upstream sources and forwarding the traffic downstream such that ONUs share wavelengths. In the illustrated example network, multiplexer 546 may comprise a cyclic multiplexer (in which each port is operable to carry traffic in more than one wavelength). In the downstream direction, each output port of multiplexer 546 is operable to forward the traffic in a corresponding one of $\lambda_1$-$\lambda_4$ to a corresponding secondary power splitter 549. In alternative embodiments, the traffic in each wavelength may pass to a different secondary power splitter than that illustrated, the traffic in more than one wavelength may pass to a secondary power splitter, and/or multiplexer 546 may receive, multiplex, and pass traffic in more than four downstream wavelengths. It should be noted that to upgrade PSPON 400 to WS-HPON 500, multiplexer 546 may be added to the lead termination section 446 of upgradeable PSPON network 400

(with input lead 447a coupled to the multiplexer's input port and output leads 447b-447n coupled to the multiplexer's output ports).

In the upstream direction, multiplexer 546 may be operable to receive and terminate the traffic in $\lambda_u$, as ONUs 550 of example WS-HPON 500 time-share $\lambda_u$ (and do not transmit traffic over multiple upstream wavelengths). Alternatively, multiplexer 546 may forward this traffic to filter 542 for suitable termination (where termination may be performed internally or externally). However, if WS-HPON 500 is upgraded to provide WDM upstream, multiplexer 546 may be operable to receive traffic in multiple upstream wavelengths from ONUs 550 and multiplex the traffic in these wavelengths, forwarding them to OLT 501.

Primary power splitter 548 may comprise any suitable power splitter and may be primary power splitter 448 of network 400. In the illustrated example WS-HPON, primary power splitter 548 is operable to receive the traffic in $\lambda_v$ and split the traffic into four copies. The power of each copy may be less than one-fourth of the power of the original signal $\lambda_v$. Primary power splitter 548 is operable to forward each copy to a corresponding secondary power splitter 549. In the upstream direction, primary power splitter 548 is operable to receive traffic transmitted by ONUs 550 over time-shared $\lambda_u$ from secondary power splitters 549 and combine this traffic into one signal. Primary power splitter 548 forwards the upstream signal to OLT 501. Primary power splitter 548 thus broadcasts the traffic in $\lambda_v$ in the downstream direction and combines traffic over time-shared $\lambda_u$ in the upstream direction. Although primary power splitter 548 is illustrated as a 1×4 power splitter, any suitable power splitter may be used.

Each secondary power splitter 549 may comprise any suitable power splitter, such as an optical coupler, operable to receive a signal from primary power splitter 548 and a signal from multiplexer 546, combine the two signals into one signal, split the combined signal into a suitable number of copies, and forward each copy to the ONUs in a corresponding wavelength-sharing group of ONUs 550 (each group of wavelength-sharing ONUs shares one of $\lambda_1$-$\lambda_4$ in the downstream direction). In the upstream direction, each secondary power splitter 549 is operable to receive traffic transmitted at $\lambda_u$ from each ONU 550 of a corresponding group of ONUs 550 and combine the traffic from each ONU 550 into one signal. Each secondary power splitter 549 is operable to split the combined upstream traffic into two copies and forward one copy to primary power splitter 548 and one copy to multiplexer 546. The copy forwarded to primary power splitter 548, as described above, is combined with other traffic from other ONUs 550 transmitted over time-shared $\lambda_u$. The copy forwarded to multiplexer 546 may be blocked or forwarded to filter 542 for suitable termination. Although secondary power splitters 549 are illustrated as 2×4 couplers in example WS-HPON 500, secondary power splitters 549 may be any suitable coupler or combination of couplers (such as a 2×2 coupler coupled to two 1×2 couplers). Secondary power splitters 549 may split or combine any suitable number of signals.

Each ONU 550 (which may be an example of a downstream terminal) may comprise any suitable ONU or ONT and may be the same as ONU 450 of FIG. 4. ONU 550 of FIG. 5 comprises a filter 560, receiver 562, filter 570, receiver 572, and transmitter 582. Each filter 560 may comprise any suitable filter and may be the same as filter 460 of network 400. Each filter 560 is operable to direct traffic in wavelength $\lambda_v$ (for example, analog video traffic) to receiver 562. Filter 560 is further operable to pass the traffic in the corresponding one of $\lambda_1$-$\lambda_4$ received at the ONU 550 to filter 570 and to pass the traffic in $\lambda_u$ to RN 540 in the upstream direction. Receiver 562 may comprise any suitable receiver and may be the same as receiver 462 of network 400. Receiver 562 is operable to receive the traffic transmitted in $\lambda_v$ and process the traffic. Each filter 570 may comprise any suitable filter and may be the same as filter 470 of network 400. Each filter 570 is operable to receive the traffic in a corresponding one of $\lambda_1$-$\lambda_4$ and direct it to receiver 572. Filter 570 is further operable to pass the traffic in upstream wavelength $\lambda_u$ to corresponding filter 560 in the upstream direction. Receiver 572 may comprise any suitable receiver and may be the same as receiver 472 of network 400. Receiver 572 is operable to receive the traffic transmitted in a corresponding one of $\lambda_1$-$\lambda_4$ and process the traffic. Receiver 572 may be operable to receive traffic in any one of $\lambda_1$-$\lambda_4$, providing flexibility in assigning (or re-assigning) an ONU 550 to a particular wavelength-sharing group. Each transmitter 582 may comprise any suitable transmitter and may be the same as transmitter 482 of network 400. Transmitter 582 is operable to transmit traffic over $\lambda_u$ in the upstream direction, applying a suitable protocol to time-share $\lambda_u$ with the other ONUs 550. It should be noted that although four ONUs are illustrated as being part of a group of ONUs in WS-HPON 500, any suitable number of ONUs may be part of a group sharing a downstream wavelength. In addition, there may be multiple groups each sharing a different downstream wavelength (as is the case in the illustrated example). It should also be noted that any suitable number of ONUs 550 may be implemented in the network. It should further be noted that ONUs 550 may be adjusted in an alternative upgrade to transmit traffic over multiple wavelengths (which may be combined by PS 548 of RN 540) to be received by receivers corresponding to transmitters 504-507 (in which case filter 529 may or may not be taken out of the line). In an alternative upgrade, each group of ONUs sharing a wavelength may transmit upstream traffic in a separate wavelength (and multiplexer 546 may multiplex these wavelengths at the RN, and receivers 504-507 may receive these wavelengths).

In operation, transmitters 504-507 and (analog video) transmitter 516 of OLT 501 may transmit traffic over $\lambda_1$-$\lambda_4$ and $\lambda_v$, respectively. Filters 508-511 receive the traffic in $\lambda_1$-$\lambda_4$, respectively, and pass the signals. Filter 508 also receives and directs the traffic in $\lambda_v$, combining it with the traffic in $\lambda_1$. As discussed above, WS-HPON 500 is configured to be easily upgraded to include additional transmitters at upgradeable transmission section 514 of OLT 501. After receiving the traffic in their corresponding wavelengths, filters 508-511 forward the corresponding signals to multiplexer 512. Multiplexer 512, which may include, for example, a cyclic multiplexer, combines the traffic in the five wavelengths into one signal and forwards the signal to filter 528. As discussed above, filter 528 may be in-line or may be switched out of the line, in which case the downstream signal would pass directly to filter 529. If filter 528 remains in-line, filter 528 receives the downstream signal and allows the signal to pass to filter 529. Filter 529 receives the signal and allows the signal to pass, forwarding the signal over optical fiber 530 to RN 540.

Filter 542 of RN 540 receives the signal and directs the traffic in (e.g., analog video) wavelength $\lambda_v$ to primary power splitter 548, allowing the traffic in $\lambda_1$-$\lambda_4$ to pass to multiplexer 546. Primary power splitter 548 receives the traffic in $\lambda_v$ and splits it into a suitable number of copies. In the illustrated embodiment, primary power splitter 548 splits the traffic in $\lambda_v$ into four copies, and forwards each copy to a corresponding secondary power splitter 549. Multiplexer 546 receives the signal comprising the traffic in $\lambda_1$-$\lambda_4$ and demultiplexes the signal into its constituent wavelengths. Multiplexer 546 then forwards the traffic in each wavelength along a corresponding fiber such that each secondary power splitter 549 receives the traffic in a corresponding one of $\lambda_1$-$\lambda_4$. Each secondary power splitter 549 thus receives traffic in a corresponding one of $\lambda_1$-$\lambda_4$ from multiplexer 546 and a copy of traffic in $\lambda_v$ from primary power splitter 548, combines the two wavelengths into one signal, and splits the signal into a suitable number of copies. In the illustrated embodiment, each secondary power splitter 549 splits the signal into four copies. In this way, the traffic (e.g., analog video) in wavelength $\lambda_v$ is broadcast to all ONUs 550 and a corresponding one of $\lambda_1$-$\lambda_4$ is transmitted to and shared by one or more groups of ONUs 550. It should be noted again that the groups of ONUs sharing a wavelength may be different than those illustrated in FIG. 5, and groups of wavelength-sharing ONUs may share more than one WDM wavelength in alternative networks.

After secondary power splitters 549 split the signal comprising the traffic in a corresponding one of $\lambda_1$-$\lambda_4$ and the traffic in $\lambda_v$ into four copies, secondary power splitters 549 forward each copy over fiber 530 such that the ONUs 550 coupled to the secondary power splitter 549 receive a copy. Filter 560 of each ONU 550 receives the signal and directs the traffic in $\lambda_v$ to receiver 562, which then processes the traffic carried over $\lambda_v$. Filter 560 passes the corresponding one of $\lambda_1$-$\lambda_4$ to filter 570. Filter 570 receives the traffic in the corresponding one of $\lambda_1$-$\lambda_4$ and directs the traffic to receiver 572 which then processes the traffic. Again, since each ONU 550 in a group may share one of $\lambda_1$-$\lambda_4$ with other ONUs 550 in the group, ONUs 550 may apply a suitable addressing protocol to process downstream traffic appropriately (i.e., to determine which portion of the traffic transmitted in the corresponding wavelength is destined for which ONU 550 in a group).

In the upstream direction, transmitter 582 of each ONU 550 transmits traffic over $\lambda_u$. Filters 570 and 560 receive the traffic in $\lambda_u$ and pass the traffic. The signal travels over fiber 530 to RN 540. Each secondary power splitter 549 of RN 540 receives traffic over time-shared $\lambda_u$ and combines the traffic from each ONU 550 in the corresponding group of ONUs 550. Again, since each ONU 550 transmits traffic over upstream wavelength $\lambda_u$, ONUs 550 may adhere to a suitable protocol to time-share $\lambda_u$ such that traffic from multiple ONUs does not collide. After receiving and combining traffic over $\lambda_u$ into one signal, each secondary power splitter 549 splits the signal into two copies, forwarding one copy to multiplexer 546 and one copy to primary power splitter 548. As discussed above, multiplexer 546 of example network 500 may block $\lambda_u$ or forward $\lambda_u$ to filter 542 for suitable termination (internal or external to filter 542). Primary power splitter 548 receives traffic over $\lambda_u$ from each secondary power splitter 549, combines the traffic, and forwards the traffic to filter 542. Filter 542 receives the combined traffic in $\lambda_u$ and directs the traffic toward OLT 501. Fiber 530 carries the traffic in $\lambda_u$ to filter 529 of OLT 501. Filter 529 receives the traffic in $\lambda_u$ and directs the traffic toward receiver 526. Receiver 526 receives the traffic and processes it.

Modifications, additions, or omissions may be made to the example WS-HPON 500 described without departing from the scope of the invention. The components of the example WS-HPON 500 described may be integrated or separated according to particular needs. Moreover, the operations of the example WS-HPON 500 described may be performed by more, fewer, or other components. As examples only, alternative networks may comprise redundant lines from the OLT suitably coupled to the RN, the RN may provide any suitable number of outputs to the ONUs, and any suitable number of wavelength routers may be added to the RN (making suitable changes to the network).

Figure 6A:
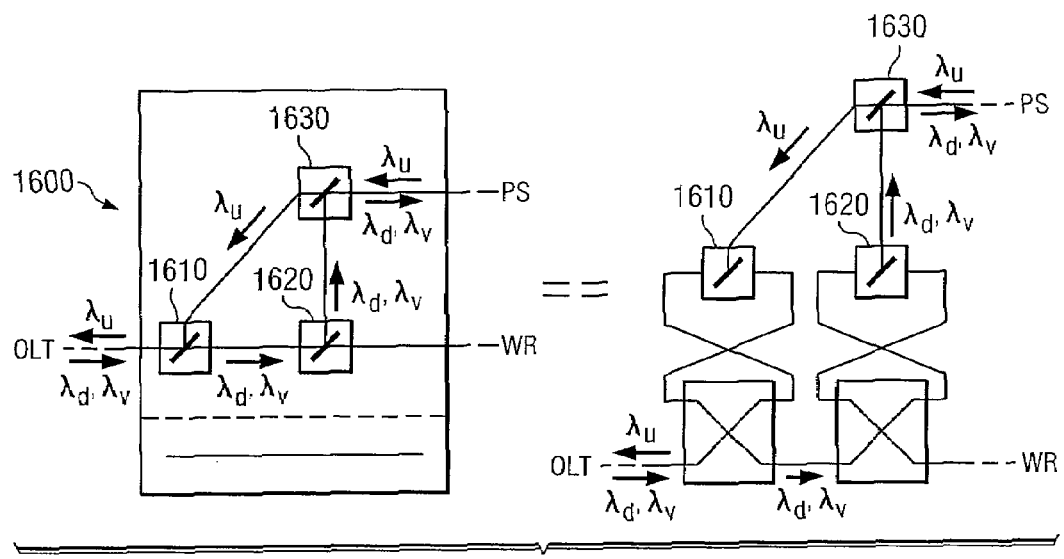
FIGS. 6A and 6B are diagrams illustrating example components of an RN for upgrading a network from a PSPON to a WS-HPON.
Figure 6B:
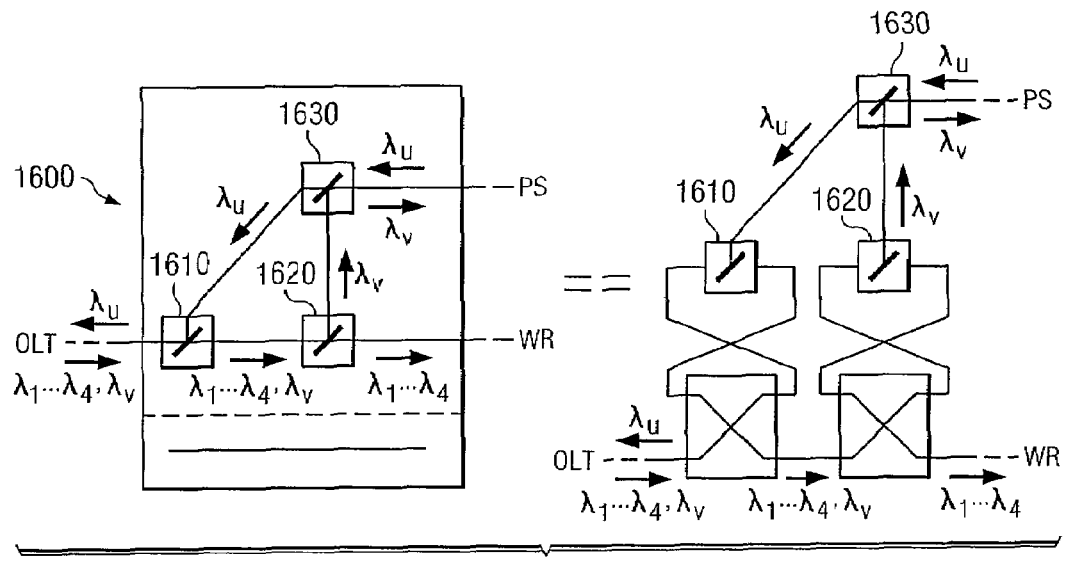

FIGS. 6A and 6B are diagrams illustrating example components of an RN for upgrading a network from a PSPON to a WS-HPON. More specifically, FIGS. 6A and 6B illustrate an example filter system 1600 that may be added to an RN of an upgradeable PSPON and remain in a WS-HPON upgrade. As an example, filter system 1600 may be used in place of filter 442 of network 400 and filter 542 of network 500. By having a filter system that is operable to suitably filter traffic for networks 400 and 500, network operators need not cut fiber, replace components, or risk contamination or service disruption at this point of the network. Thus, filter system 1600 may enhance the upgradeability of PSPON 400 by anticipating upgrades to the network (such as that described in conjunction with network 500). It should be noted that the left side of each of FIGS. 6A and 6B illustrates a symbolic representation of the state of the filter(s) (in or out of the line). The right side illustrates actual example components for switching of the filter(s) in or out of the line.

Filter system 1600 comprises filters 1610, 1620, and 1630 coupled to corresponding switches. Filter 1610 may comprise any suitable filter operable to pass downstream WDM traffic (for example, in the above-described WS-HPON, traffic in $\lambda_1$-$\lambda_4$) and broadcast traffic (for example, in the above-described WS-HPON, traffic in $\lambda_d$ and $\lambda_v$) to filter 1620. Filter 1610 is further operable to receive traffic in upstream wavelength $\lambda_u$ from filter 1630 and direct it to the OLT. Filter 1620 may comprise any suitable filter operable to receive the downstream WDM traffic and broadcast traffic from filter 1610, direct the broadcast traffic toward filter 1630, and pass the WDM traffic toward a wavelength router. Filter 1630 may comprise any suitable filter and is operable to receive the downstream broadcast traffic from filter 1620 and direct the broadcast traffic toward the power splitter. Filter 1630 is further operable to receive upstream traffic in $\lambda_u$ and pass it to filter 1610.

FIG. 6A illustrates the components and operation of filter system 1600 in a PSPON such as upgradeable PSPON 400. In operation, filter 1610 receives downstream broadcast traffic in $\lambda_d$ and $\lambda_v$ and passes $\lambda_d$ and $\lambda_v$ to filter 1620. Filter 1620 receives the downstream broadcast traffic and directs it toward filter 1630. Filter 1630 receives the downstream broadcast traffic and directs it toward the power splitter. In the upstream direction, filter 1630 receives upstream traffic in time-shared $\lambda_u$ and passes it to filter 1610. Filter 1610 receives the upstream traffic and directs it toward the OLT.

FIG. 6B illustrates the components and operation of filter system 1600 of FIG. 6A after an upgrade to a WS-HPON (such as WS-HPON 500 of FIG. 5). The upgrade includes the addition of four new transmitters which transmit downstream WDM traffic in $\lambda_1$-$\lambda_4$. Furthermore, in this upgrade, downstream traffic is being broadcast only in $\lambda_v$. Upstream traffic continues to be transmitted in time-shared $\lambda_u$. In operation, in the downstream direction, filter 1610 receives WDM traffic in $\lambda_1$-$\lambda_4$ and broadcast traffic in $\lambda_v$, and passes the traffic in $\lambda_1$-$\lambda_4$ and $\lambda_v$ to filter 1620. Filter 1620 receives the traffic in $\lambda_1$-$\lambda_4$ and $\lambda_v$, directs the traffic in $\lambda_v$ toward filter 1630, and allows the traffic in $\lambda_1$-$\lambda_4$ to pass to the wavelength router. Filter 1630 receives the traffic in $\lambda_v$ and directs it toward the power splitter. In the upstream direction, filter 1630 receives the traffic in $\lambda_u$ and allows it to pass to filter 1610. Filter 1610 receives the traffic in $\lambda_u$ and directs it toward the OLT. Thus, an upgrade from PSPON to WS-HPON may be made without replacing components at this point in the network, avoiding service disruption and contamination of components.

Modifications, additions, or omissions may be made to the filter system and 1600 described without departing from the scope of the invention. The components of the filter system 1600 described may be integrated or separated according to particular needs. Moreover, the operations of the filter system 1600 described may be performed by more, fewer, or other components.

Although filter system 1600 of FIGS. 6A and 6B may be used to provide an in-service upgrade from a PSPON, a potential disadvantage of the filter system design may be its cost. For example, in particular embodiments, if $\lambda_d$ and/or $\lambda_v$ are relatively close to one of $\lambda_1$-$\lambda_4$, filter system 1600 may require a relatively expensive narrow-band filter with a sharp edge (at filter 1620) that can direct downstream broadcast traffic in $\lambda_d$ and $\lambda_v$ to filter 1630 and pass downstream WDM traffic in $\lambda_1$-$\lambda_4$ to the wavelength router. Another potential disadvantage of the filter system design may be the power loss of particular signals produced by the design. For example, in particular embodiments, traffic in $\lambda_u$ may experience insertion loss first at filter 1630 and then at filter 1610 before being directed to the OLT. Thus, a need exists for a more effective in-service upgrade solution.

Figure 7:
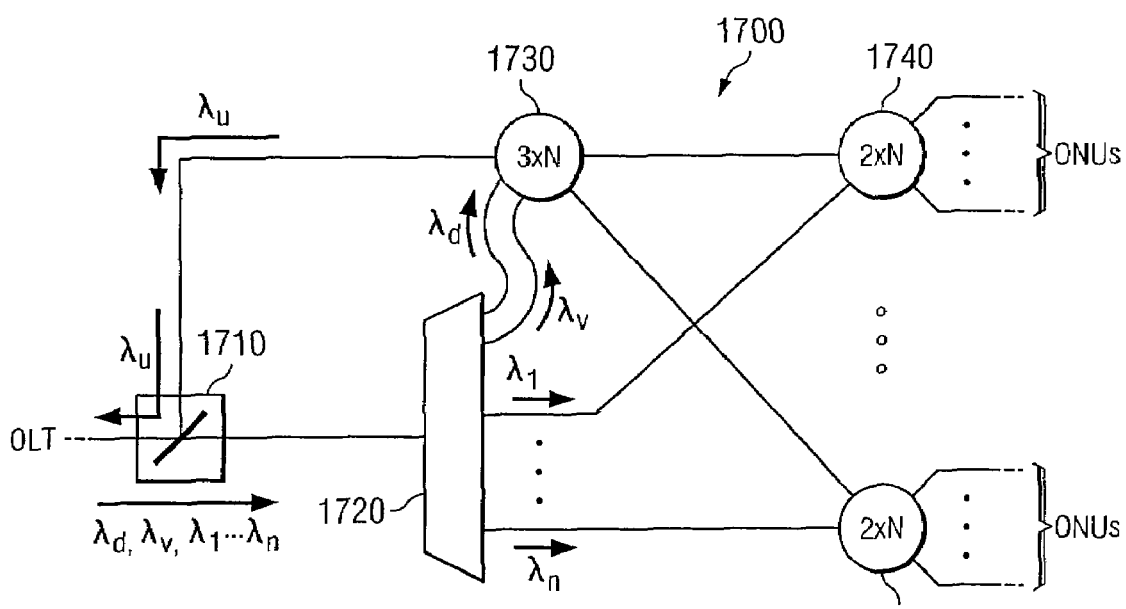
FIG. 7 is a diagram illustrating another example RN for enabling the upgrade of a network from a PSPON to a WS-HPON.

FIG. 7 is a diagram illustrating another example RN 1700 for enabling the upgrade of a network from a PSPON to a WS-HPON. In particular embodiments, RN 1700 may be implemented in a PSPON to enable the upgrade of the network to an HPON or to a WDMPON. In particular embodiments, due to the design of RN 1700, network operators need not cut fiber, replace components, or risk service disruption at this point of the network to upgrade from a PSPON. Besides providing for an in-service upgrade, RN 1700 may also provide a cost-effective and power-effective solution in particular embodiments, as discussed further below.

RN 1700 comprises filter 1710, wavelength router 1720, primary power splitter 1730, and secondary power splitters 1740. Filter 1710 comprises any suitable filter operable to direct traffic in $\lambda_d$ and $\lambda_v$ (or any other/additional wavelength(s) or type(s) of signal to be broadcast to all ONUs) and traffic in $\lambda_1$-$\lambda_n$ (or any other/additional wavelength(s) or type(s) of signal which is to be routed to particular ONUs) to wavelength router 1720. In particular embodiments, filter 1710 may direct all downstream traffic to wavelength router 1720. Filter 1710 may also be operable to receive traffic in $\lambda_u$ (or any other/additional upstream wavelength(s) or type(s) of signal) from primary power splitter 1730 and direct this traffic to an upstream OLT.

Wavelength router 1720 may comprise any suitable wavelength router, such as, for example, a multiplexer, operable to receive a signal from filter 1710 and suitably route the signal's constituent wavelengths. In the illustrated embodiment, wavelength router 1720 is operable to route $\lambda_d$ and $\lambda_v$ to primary power splitter 1730. In general, wavelength router 1720 may route any wavelengths which are to be broadcast to all ONUs to primary power splitter 1730. Wavelength router 1720 is further operable to route $\lambda_1$-$\lambda_n$ to corresponding secondary power splitters 1740. In general, wavelength router 1720 may route any wavelengths which are to be routed to particular ONUs (and not broadcast to all ONUs) to the secondary power splitters 1740 associated with the particular ONUs.

Primary power splitter 1730 comprises any suitable power splitter or coupler, such as, for example, an M×N coupler. In the illustrated embodiment, primary power splitter 1730 comprises a 3×N coupler. Primary power splitter 1730 is operable to receive traffic in $\lambda_d$ and $\lambda_v$ from wavelength router 1720, combine the traffic in $\lambda_d$ and $\lambda_v$, split the combined traffic into a suitable number of copies, and forward a copy to each secondary power splitter 1740. In the upstream direction, primary power splitter 1730 is operable to combine traffic received from each ONU (forwarded by secondary power splitters 1740) and forward the traffic to filter 1710. Primary power splitter 1730 may also forward a copy of the upstream traffic to wavelength router 1720 (i.e., over the $\lambda_d$ and $\lambda_v$ fibers), which may suitably facilitate the termination of this copy of the upstream traffic.

Each secondary power splitter 1740 comprises any suitable coupler or combination of couplers, such as, for example, an M×N coupler. Alternatively, a secondary power splitter 1740 may comprise a combining filter in particular embodiments. In the illustrated embodiment, each secondary power splitter 1740 comprises a 2×N coupler. Each secondary power splitter 1740 is operable to receive a copy of the combined traffic in $\lambda_d$ and $\lambda_v$ from primary power splitter 1730 and the traffic in a corresponding one of $\lambda_1$-$\lambda_u$ from wavelength router 1720. Each secondary power splitter 1740 is further operable to combine the two signals into one signal, split the combined signal into a suitable number of copies, and forward each copy to particular downstream ONUs coupled to the splitter 1740. In particular embodiments, each secondary power splitter 1740 may forward copies to ONUs in a corresponding group of wavelength-sharing ONUs (i.e., in WS-HPON). In alternative embodiments, each secondary power splitter 1740 may forward a copy to only one corresponding ONU (i.e., WDMPON). In these embodiments, secondary power splitters 1740 may comprise 2×1 couplers, for example. Alternatively, secondary power splitters 1740 may comprise a combining filter or any other suitable combiner. Thus, in these embodiments, each secondary power splitter 1740 may not split the combined downstream signal before forwarding the downstream signal to a corresponding ONU. In the upstream direction, each secondary power splitter 1740 is operable to receive upstream traffic from ONUs coupled to the power splitter 1740, combine the traffic into one signal, and forward the signal to power splitter 1730 (which then combines the traffic received from all of the power splitters 1740). In particular embodiments, ONUs may time-share one or more wavelengths. For example, ONUs may time share $\lambda_u$, as illustrated. Each secondary power splitter 1740 also may forward a copy of the traffic received from the associated ONUs to wavelength router 1720 (since it is coupled to wavelength router 1720 for the receipt of downstream traffic), which may facilitate the termination of the received copy.

In operation, when implemented in a PSPON, such as PSPON 400 of FIG. 4, filter 1710 receives a downstream signal comprising traffic in $\lambda_d$ and $\lambda_v$ and directs the traffic in $\lambda_d$ and $\lambda_v$ to wavelength router 1720. Wavelength router 1720 receives the traffic in $\lambda_d$ and $\lambda_v$ from filter 1710 and routes $\lambda_d$ and $\lambda_v$ to primary power splitter 1730. Primary power splitter 1730 receives the traffic in $\lambda_d$ and $\lambda_v$ from wavelength router 1720, combines the traffic in $\lambda_d$ and $\lambda_v$ into one signal, splits the combined signal into a suitable number of copies, and forwards each copy to a corresponding secondary power splitter 1740. Each secondary power splitter 1740 receives a copy from primary power splitter 1730, splits the received copy into a suitable number of copies, and forwards each copy to particular downstream ONUs.

In the upstream direction, each secondary power splitter 1740 receives upstream traffic from downstream ONUs coupled to the power splitter 1740 (again, which is typically traffic in a single time-shared wavelength), combines the traffic into one signal, and forwards a copy of the combined traffic to primary power splitter 1730. As a by-product of being coupled to wavelength router 1720, power splitters 1740 also send a copy of the combined traffic to wavelength router 1720. Primary power splitter 1730 combines traffic forwarded by secondary power splitters 1740 and forwards the combined traffic to wavelength router 1730 (i.e., over the $\lambda_d$ and $\lambda_v$ fibers) and to filter 1710. Wavelength router 1720 terminates any upstream signal it receives (i.e., from primary power splitter 1730 or secondary power splitters 1740) or forwards the upstream signal to filter 1710 for suitable termination. Filter 1710 receives the combined upstream traffic from primary power splitter 1730 and directs this traffic to the OLT. Filter 1710 may terminate any upstream traffic forwarded by wavelength router 1720. Alternatively, if upstream traffic in particular wavelength(s) is designed to pass through wavelength router 1720 to the OLT, filter 1710 may forward this traffic to the OLT.

When implemented in an HPON or WDMPON, filter 1710 receives a downstream signal comprising traffic in $\lambda_1$-$\lambda_n$ and directs the traffic to wavelength router 1720. Optionally, filter 1710 may also receive traffic in $\lambda_d$ and $\lambda_v$ (or any other signal to be broadcast) and also direct the traffic to wavelength router 1720. Wavelength router 1720 receives the traffic in $\lambda_d$, $\lambda_v$, and $\lambda_1$-$\lambda_n$ from filter 1710 and routes $\lambda_d$ and $\lambda_v$ to primary power splitter 1730. Wavelength router 1720 also routes $\lambda_1$-$\lambda_n$ to corresponding secondary power splitters 1740. Primary power splitter 1730 may receive the traffic in $\lambda_d$ and $\lambda_v$ from wavelength router 1720, combine the traffic in $\lambda_d$ and $\lambda_v$ into one signal, split the combined signal into a suitable number of copies, and forward each copy to a corresponding secondary power splitter 1740. Each secondary power splitter 1740 receives a copy of traffic in $\lambda_d$ and $\lambda_v$ from primary power splitter 1740 (if broadcast traffic is present) and traffic in a corresponding one of $\lambda_1$-$\lambda_u$ from wavelength router 1720. Each secondary power splitter 1740 combines the two signals into one signal, splits the signal into a suitable number of copies, and forwards each copy to particular downstream ONUs coupled to the power splitter 1740.

In the upstream direction, each secondary power splitter 1740 receives upstream traffic from downstream ONUs coupled to the power splitter 1740 (again, which is typically traffic in a single time-shared wavelength), combines the traffic into one signal, and forwards a copy of the combined traffic to primary power splitter 1730. As a by-product of being coupled to wavelength router 1720, power splitters 1740 also send a copy of the combined traffic to wavelength router 1720. Primary power splitter 1730 combines traffic forwarded by secondary power splitters 1740 and forwards the combined traffic to wavelength router 1730 (i.e., over the $\lambda_d$ and $\lambda_v$ fibers) and to filter 1710. Wavelength router 1720 terminates any upstream signal it receives (i.e., from primary power splitter 1730 or secondary power splitters 1740) or forwards the upstream signal to filter 1710 for suitable termination. Filter 1710 receives the combined upstream traffic from primary power splitter 1730 and directs this traffic to the OLT. Filter 1710 terminates any upstream traffic forwarded by wavelength router 1720.

Particular embodiments of RN 1700 may provide several advantages. For example, by routing PSPON broadcast signals through wavelength router 1720, in-service upgrades from a PSPON to an HPON or WDMPON may be achieved. In other words, network operators need not cut fiber, replace components, or risk service disruption at this point of the network to upgrade from a PSPON. Instead, downstream WDM traffic may be added to (or may replace) the downstream broadcast signal and be routed through the wavelength router.

Another technical advantage of particular embodiments may be assessed relative to filter system 1600 described above in FIGS. 6A and 6B (which may also be used to provide an in-service upgrade from a PSPON). Specifically, particular embodiments of RN 1700 may be more cost-efficient than other in-service upgrade solutions like filter system 1600. As illustrated in FIGS. 6A and 6B, in particular example filter systems 1600, filter 1620 is operable to direct downstream broadcast traffic in $\lambda_d$ and $\lambda_v$ to filter 1630 and pass downstream WDM traffic in $\lambda_1$-$\lambda_4$ to a wavelength router. This functionality may require a relatively expensive, narrowband filter with a sharp edge if, for example, $\lambda_d$ and/or $\lambda_v$ are relatively close to one of $\lambda_1$-$\lambda_4$.

For example, according to the "GPON" ITU-T G.984 standard, broadcast wavelength $\lambda_d$ may include the band centered around 1490 nm and WDM wavelengths $\lambda_1$-$\lambda_4$ may include the bands centered around 1410, 1430, 1450, and 1470 nm, respectively. A filter (i.e., filter 1620) that directs the 1410-1470 nm wavelengths in one direction and the 1490 nm wavelength in another direction may require a relatively expensive narrow band filter because $\lambda_d$ is relatively close to $\lambda_1$-$\lambda_4$. In contrast, a filter (i.e., filter 1710) that directs these wavelengths in the same direction may require a relatively less expensive, shallow edge, broadband filter. Furthermore, because $\lambda_u$ and $\lambda_v$ are not relatively close to $\lambda_d$ or $\lambda_1$-$\lambda_4$, $\lambda_u$ (and/or $\lambda_v$) may be filtered separately from $\lambda_d$ and $\lambda_1$-$\lambda_4$ using such a less-expensive, shallow edge, broadband filter. In RN 1700, the finer separation of the broadcast wavelengths and WDM wavelengths (i.e., $\lambda_d$ and $\lambda_1$-$\lambda_4$, respectively) may be performed at wavelength router 1720. Since wavelength router 1720 may already be used in an upgrade to HPON or WDMPON, particular embodiments of RN 1700 may be cost-efficient relative to other in-service upgrade solutions.

Another technical advantage of particular embodiments relative to filter system 1600 may be the reduction in power loss of particular signals. For example, insertion loss experienced by the upstream signal may be reduced in RN 1700. In filter system 1600, after being forwarded by the primary power splitter, traffic in $\lambda_u$ may experience insertion loss first at filter 1630 and then at filter 1610 before being directed to the OLT. In particular embodiments of RN 1700, after being forwarded by the primary power splitter, traffic in $\lambda_u$ may experience insertion loss only at one filter, filter 1710, before being directed to the OLT. Thus, particular embodiments of RN 1700 may reduce power loss in the upstream signal relative to other in-service upgrade solutions.

It should be noted that, although the illustrated embodiment includes two downstream broadcast signals, $\lambda_d$ and $\lambda_v$, routed to primary power splitter 1730 by wavelength router 1720, RN 1700 may receive and route any suitable number of downstream broadcast signals (including, for example, none or one). It should further be noted that, in particular embodiments, each secondary power splitter 1740 may direct downstream traffic to a corresponding ONU, such as, for example, in WDMPON. In alternative embodiments, each secondary power splitter 1740 may direct downstream traffic to a corresponding group of wavelength-sharing ONUs, such as, for example, in WS-HPON. It should also be noted that, in particular embodiments, RN 1700 may be rewired to route downstream broadcast wavelengths, such as, for example, $\lambda_d$ and $\lambda_v$, to one or more secondary power splitters 1740 (instead of primary power splitter 1730) after an upgrade from PSPON. In this way, the broadcast wavelengths may be reused as WDM wavelengths in an HPON or WDMPON. In particular embodiments, wavelength allocation may be changed in any other suitable manner, providing flexibility in allocation of wavelengths. In alternative embodiments, $\lambda_d$ and $\lambda_v$ (or other/ additional PSPON broadcast wavelengths) may be reused after an upgrade without rewiring RN 1700 by transmitting traffic in these wavelengths only for particular ONUs (although all ONUs would receive this broadcast traffic from power splitter 1730). In particular of these embodiments, other/additional filters and receivers at the ONUs may be required.

Modifications, additions, or omissions may be made to the RN 1700 described without departing from the scope of the invention. The components of the RN 1700 described may be integrated or separated according to particular needs. Moreover, the operations of the RN 1700 described may be performed by more, fewer, or other components.

Although the present invention has been described with several embodiments, various changes and modifications may be suggested to one skilled in the art. It is intended that the present invention encompass such changes and modifications as fall within the scope of the appended claims.

What is claimed:

1. A distribution node in an optical network, the optical network comprising an upstream terminal, the distribution node, and a plurality of downstream terminals, the distribution node comprising:
    a wavelength router configured to receive wavelength division multiplexed (WDM) traffic in a plurality of wavelengths from the upstream terminal, route the traffic in at least one wavelength to a primary power splitter, and route the traffic in a plurality of other wavelengths for distribution to particular downstream terminals;
    a primary power splitter configured to receive the traffic in the at least one wavelength from the wavelength router, split the received traffic in the at least one wavelength into a plurality of copies, and forward the copies for distribution to all of the downstream terminals; and
    a filter configured to receive the WDM traffic in the plurality of wavelengths and direct the WDM traffic in the plurality of wavelengths to the wavelength router and configured to receive upstream traffic in at least one wavelength from the plurality of downstream terminals without the upstream traffic passing through the wavelength router and direct the upstream traffic in the at least one wavelength to the upstream terminal.

2. The distribution node of claim 1, wherein:
    the optical network comprises a passive optical network (PON);
    the upstream terminal comprises an optical line terminal (OLT);
    the plurality of downstream terminals comprise a plurality of optical network units (ONUs); and
    the wavelength router comprises a demultiplexer.

3. The distribution node of claim 1, wherein the primary power splitter is further configured to:
    receive upstream traffic from the plurality of downstream terminals;
    combine the upstream traffic into one signal; and
    forward the combined signal to the filter.

4. The distribution node of claim 1, wherein routing traffic in the plurality of other wavelengths for distribution to particular downstream terminals comprises routing traffic in each wavelength in the plurality of other wavelengths to a plurality of downstream terminals.

5. A method for distributing traffic in a distribution node in an optical network, the optical network comprising an upstream terminal, the distribution node, and a plurality of downstream terminals, the method comprising:
    receiving wavelength division multiplexed (WDM) traffic in a plurality of wavelengths at a filter of the distribution node from the upstream terminal and, at the filter, directing the WDM traffic in the plurality of wavelengths to a wavelength router of the distribution node;
    using the wavelength router, routing traffic in at least one wavelength for distribution to all downstream terminals;
    using the wavelength router, routing traffic in a plurality of other wavelengths for distribution to particular downstream terminals; and
    receiving upstream traffic in at least one wavelength at the filter from the plurality of downstream terminals without the upstream traffic passing through the wavelength router and directing the upstream traffic in the at least one wavelength from the filter to the upstream terminal.

6. The method of claim 5, wherein:
    the optical network comprises a passive optical network (PON);
    the upstream terminal comprises an optical line terminal (OLT);
    the plurality of downstream terminals comprise a plurality of optical network units (ONUs);
    the wavelength router comprises a demultiplexer;
    the WDM traffic is received at the demultiplexer; and
    the at least one wavelength and the plurality of other wavelengths are routed by the demultiplexer.

7. The method of claim 5, wherein:
    routing traffic in at least one wavelength for distribution to all downstream terminals comprises routing the traffic to a primary power splitter; and
    the method further comprises:
        splitting the traffic in the at least one wavelength into a plurality of copies at the primary power splitter; and
        forwarding the copies from the primary power splitter for distribution to all downstream terminals.

8. The method of claim 7, further comprising:
    receiving upstream traffic from the plurality of downstream terminals at the primary power splitter;
    combining the upstream traffic into one signal at the primary power splitter; and
    forwarding the combined signal to the filter.

9. The method of claim 5, wherein routing traffic in the plurality of other wavelengths for distribution to particular downstream terminals comprises routing traffic in each wavelength in the plurality of other wavelengths to a plurality of downstream terminals.

10. The method of claim 5, wherein:
    when the optical network comprises a power-splitting passive optical network (PSPON), only traffic in wavelengths for distribution to all downstream terminals is routed and traffic in wavelengths for distribution to only particular downstream terminals is not routed; and
    when the optical network comprises a hybrid passive optical network (HPON), traffic in wavelengths for distribution to only particular downstream terminals is routed.

* * * * *

UNITED STATES PATENT AND TRADEMARK OFFICE
CERTIFICATE OF CORRECTION

PATENT NO.       : 7,653,309 B2
APPLICATION NO.  : 11/426879
DATED            : January 26, 2010
INVENTOR(S)      : Martin Bouda et al.

Page 1 of 1

It is certified that error appears in the above-identified patent and that said Letters Patent is hereby corrected as shown below:

Column 20, Line 14, after "of $\lambda_1$-" delete "$\lambda_u$" and insert -- $\lambda_n$ --.
Column 21, Line 28, after "of $\lambda_1$-" delete "$\lambda_u$" and insert -- $\lambda_n$ --.

Signed and Sealed this
Fourth Day of October, 2011

David J. Kappos
*Director of the United States Patent and Trademark Office*